United States Patent
Yonezawa

(10) Patent No.: US 11,747,716 B2
(45) Date of Patent: Sep. 5, 2023

(54) ACCESSORY APPARATUS, IMAGE PICKUP APPARATUS, IMAGE PICKUP SYSTEM, COMMUNICATION APPARATUS, COMMUNICATION METHOD, AND STORAGE MEDIUM

(71) Applicant: CANON KABUSHIKI KAISHA, Tokyo (JP)

(72) Inventor: Takeshi Yonezawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 17/473,478

(22) Filed: Sep. 13, 2021

(65) Prior Publication Data
US 2022/0086341 A1 Mar. 17, 2022

(30) Foreign Application Priority Data
Sep. 16, 2020 (JP) ................................. 2020-155592

(51) Int. Cl.
*G03B 17/14* (2021.01)
*H04N 23/663* (2023.01)

(52) U.S. Cl.
CPC ........... *G03B 17/14* (2013.01); *H04N 23/663* (2023.01)

(58) Field of Classification Search
CPC ............ G03B 17/14; G03B 2205/0007; G03B 2205/0046; G03B 3/00; G03B 13/36; H04N 23/663; H04N 23/673; H04N 23/687; H04N 23/69
See application file for complete search history.

(56) References Cited

U.S. PATENT DOCUMENTS

| 2012/0294598 A1* | 11/2012 | Oikawa .................. G03B 17/14 |
| | | 396/125 |
| 2018/0115697 A1* | 4/2018 | Kawada ............... H04N 23/663 |
| 2020/0004112 A1* | 1/2020 | Sugita .................... H04N 23/69 |
| 2020/0096839 A1* | 3/2020 | Shigeta .................. H04N 23/67 |
| 2020/0099850 A1* | 3/2020 | Watanabe ............. H04N 23/55 |

(Continued)

FOREIGN PATENT DOCUMENTS

| EP | 3410697 A1 | 12/2018 |
| JP | H06197150 A | 7/1994 |
| JP | 2005277804 A | 10/2005 |

(Continued)

*Primary Examiner* — Timothy J Henn
(74) *Attorney, Agent, or Firm* — Canon U.S.A., Inc. IP Division

(57) ABSTRACT

An accessory apparatus including an optical member, and configured to be detachably attached to an image pickup apparatus, includes a communication unit. The communication unit is configured to communicate with the image pickup apparatus with a first communication for the image pickup apparatus to perform notification to the accessory apparatus that the image pickup apparatus communicates with the accessory apparatus, and a second communication and a third communication to be used for performing communication between the image pickup apparatus and the accessory apparatus that has received the notification. A time interval between two request signals for requesting standby of communication between the image pickup apparatus and the accessory apparatus with the third communication is longer than that with the second communication.

21 Claims, 23 Drawing Sheets

(56) References Cited

U.S. PATENT DOCUMENTS

2020/0099859 A1* 3/2020 Uchiyama .............. H04N 23/65
2020/0120259 A1* 4/2020 Sugiyama .............. H04N 23/65

FOREIGN PATENT DOCUMENTS

| JP | 2005310997 A | 11/2005 |
| JP | 6427287 B1 | 11/2018 |
| JP | 2018205705 A | 12/2018 |
| JP | 2018205711 A | 12/2018 |
| JP | 2018205720 A | 12/2018 |

* cited by examiner

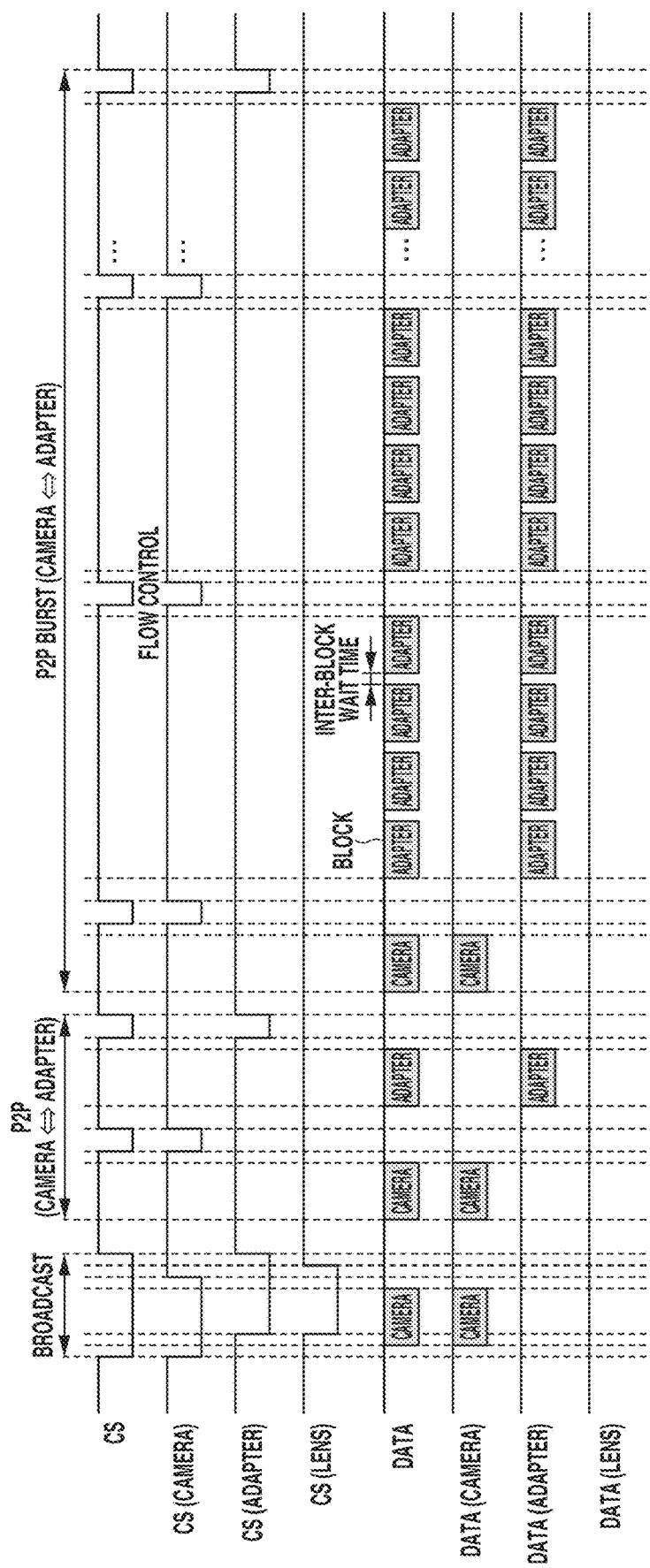

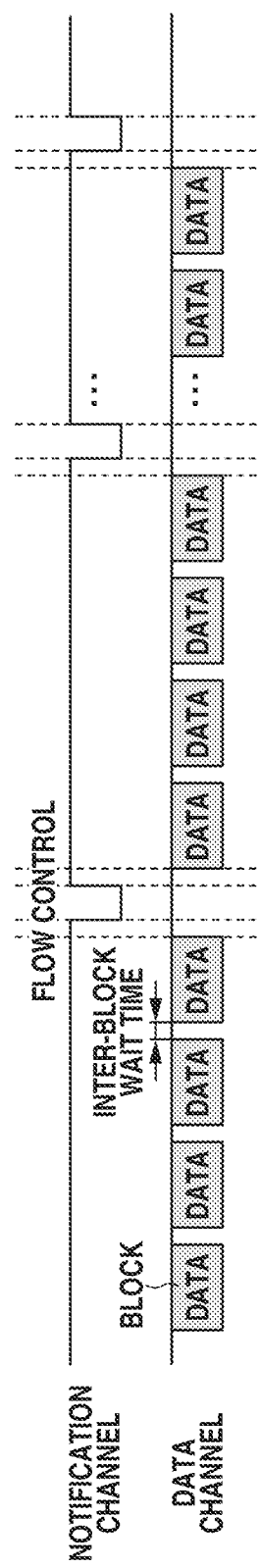

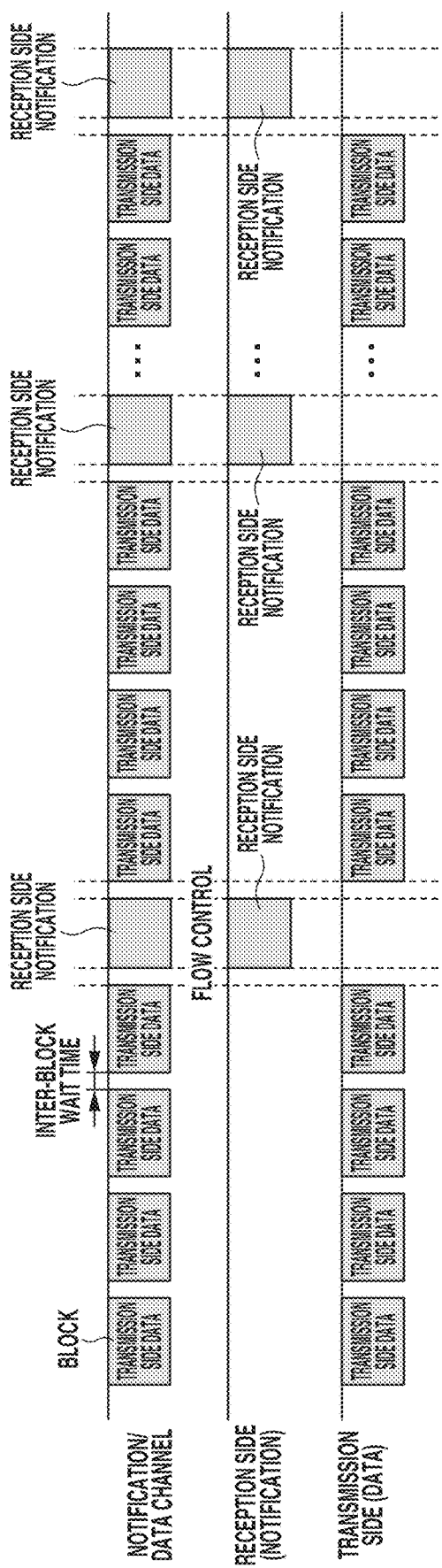

ACCESSORY APPARATUS, IMAGE PICKUP APPARATUS, IMAGE PICKUP SYSTEM, COMMUNICATION APPARATUS, COMMUNICATION METHOD, AND STORAGE MEDIUM

BACKGROUND OF THE INVENTION

Field of the Invention

An aspect of disclosures relates to an accessory apparatus, an image pickup apparatus, an image pickup system, a communication apparatus, a communication method, and a storage medium.

Description of the Related Art

In an interchangeable lens imaging system, an interchangeable lens performs the driving of a focus lens unit and the driving of an aperture stop in accordance with a control command from an imaging apparatus (also referred to as a camera main body or an image pickup apparatus). In the system, the transmission of a control command from the camera main body to the interchangeable lens, and the transmission of information (data) from the interchangeable lens to the camera main body are performed via a communication channel. In moving image capturing and live view display, the camera system is demanded to perform smooth interchangeable lens control synchronized with an image capturing cycle. For performing such control, it is necessary to synchronize an image capturing timing of the camera main body and a control timing of the interchangeable lens. The camera main body therefore needs to complete the acquisition of information necessary for controlling the interchangeable lens, and the transmission of a control command to the interchangeable lens, within an image capturing cycle. In recent years, an amount of information acquired by a camera main body from an interchangeable lens has increased due to the advancement of image capturing control, and an amount of data to be communicated within a unit time has increased due to the shortening of an image capturing cycle (increase in frame rates).

The system includes not only the interchangeable lens but also an accessory apparatus serving as an intermediate adapter, such as a wide converter or a teleconverter attached between the camera main body and the interchangeable lens. Thus, communication performed via the communication channel between the camera main body and the accessory apparatus is "one-to-many" communication. Japanese Patent No. 6427287 discusses a system capable of performing the "one-to-many" communication.

In the system discussed in Japanese Patent No. 6427287, when a large amount of data is transmitted from an accessory apparatus to a camera main body, the camera main body performs processing of receiving the large amount of data. In this case, the camera main body repeats data request processing and data receiving processing in a case of issuing a data request by dividing the data by a size receivable in one receiving processing. The communication might therefore take a long time. In addition, the completion of processing different from the communication processing might be delayed.

SUMMARY OF THE INVENTION

An aspect of disclosures provides, for example, an accessory apparatus beneficial in efficient data communication.

An accessory apparatus including an optical member, and configured to be detachably attached to an image pickup apparatus includes a communication unit configured to perform communication with the image pickup apparatus with a first communication for the image pickup apparatus to perform notification to the accessory apparatus that the imaging apparatus communicates with the accessory apparatus, and a second communication and a third communication to be used for performing communication between the image pickup apparatus and the accessory apparatus that has received the notification. A time interval between two request signals for requesting standby of communication between the image pickup apparatus and the accessory apparatus with the third communication is longer than that with the second communication.

Further features of the present invention will become apparent from the following description of exemplary embodiments with reference to the attached drawings.

BRIEF DESCRIPTION OF THE DRAWINGS

FIG. 11 is a diagram exemplifying a signal waveform in P2P burst communication (communication sub device transmission).

FIG. 21 is a diagram exemplifying a signal waveform in burst communication that uses a first communication channel and a second communication channel.

FIG. 22 is a diagram exemplifying a signal waveform in burst communication that uses a single communication channel.

DESCRIPTION OF THE EMBODIMENTS

Figure 1:
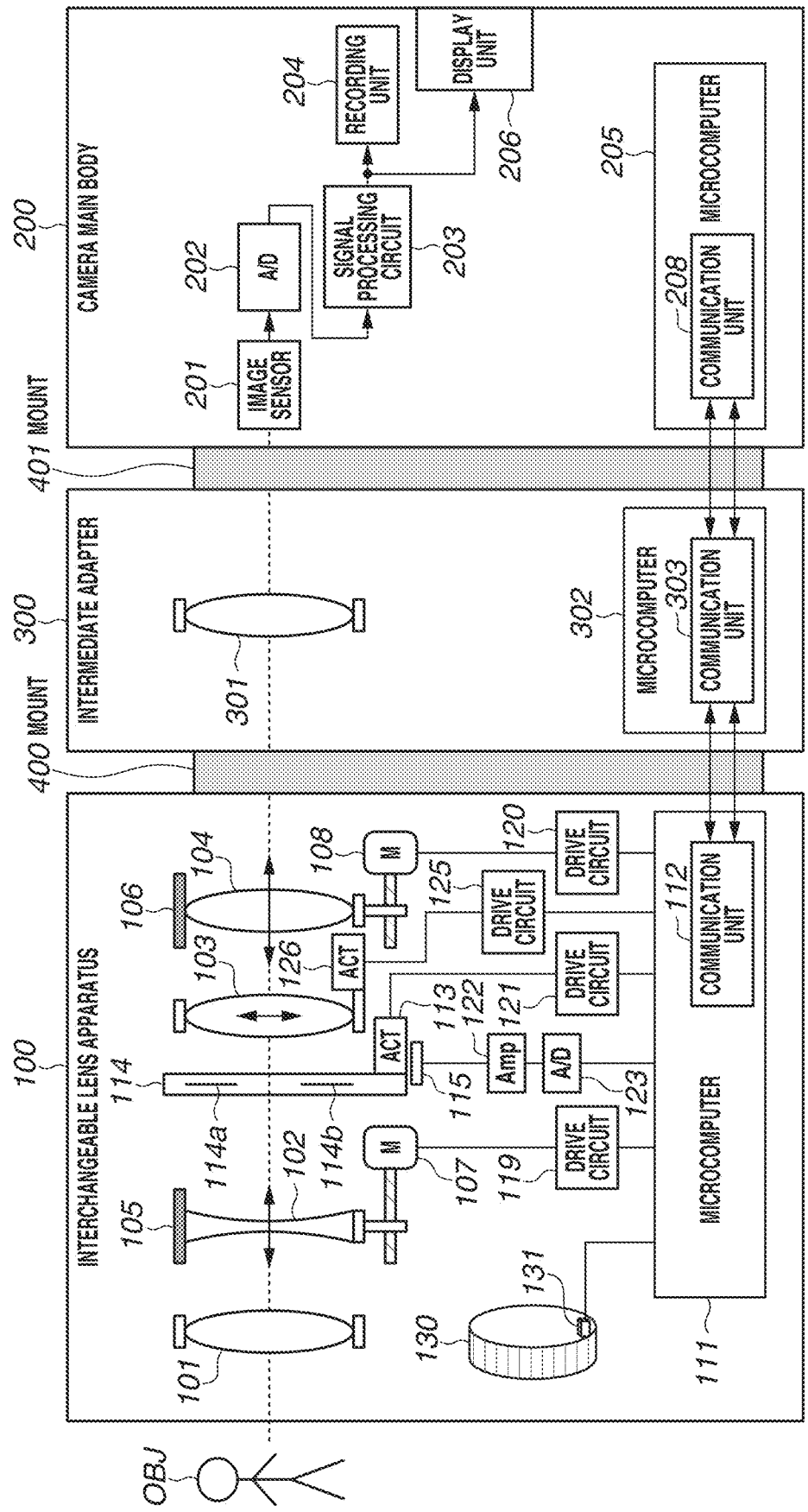
FIG. 1 is a block diagram illustrating a configuration example of an imaging system.

Hereinafter, exemplary embodiments of the present invention will be described with reference to the attached drawings. In all the drawings for describing the exemplary embodiments, as a general rule (unless otherwise stated), the same reference numerals are assigned to the same members, and the redundant description will be omitted.

<Imaging System>

FIG. 1 is a diagram illustrating a configuration example of an imaging system (also referred to as an image pickup system) according to a first exemplary embodiment. The imaging system includes an imaging apparatus 200 (camera main body), an intermediate adapter 300 serving as an accessory apparatus that is detachably attached to the camera main body 200, and an interchangeable lens apparatus 100 serving as an accessory apparatus that is detachably attached to the intermediate adapter 300. The camera main body 200 and an accessory apparatus, such as the interchangeable lens apparatus 100 and the intermediate adapter 300, perform communication with each other (e.g., transmission of control command or internal information) using their respective communication units. The communication units each support a plurality of communication methods, and communicate in communication formats most appropriate for various situations by switching to the same communication method in synchronization with each other, in accordance with the type of data to be communicated or a communication purpose. FIG. 1 exemplifies a configuration in which the intermediate adapter 300 is attached to the camera main body 200, but the configuration is not limited to this. The interchangeable lens apparatus 100 may be directly attached to the camera main body 200, or a plurality of intermediate adapters may be attached between the camera main body 200 and the interchangeable lens apparatus 100.

The interchangeable lens apparatus 100 and the intermediate adapter 300 are mechanically and electrically connected via a mount 400. In a similar manner, the intermediate adapter 300 and the camera main body 200 are mechanically and electrically connected via a mount 401. The interchangeable lens apparatus 100 and the intermediate adapter 300 use power source supplied from the camera main body 200 via power supply terminal units provided on the mounts 400 and 401, to operate various actuators and microcomputers described below. The interchangeable lens apparatus 100, the intermediate adapter 300, and the camera main body 200 communicate with each other via communication terminal units (described below with reference to FIG. 2) provided on the mounts 400 and 401.

The interchangeable lens apparatus 100 includes an imaging optical system. The imaging optical system includes, as optical members, a front lens unit 101, a zoom lens unit (magnification varying lens unit) 102 moving for zooming (magnification varying), and an aperture stop unit 114 for adjusting a light amount, in order from an object side (OBJ side) to an image side. The imaging optical system further includes an image stabilization lens unit 103 moving for image stabilization, and a focus lens unit 104 moving for focusing.

The zoom lens unit 102 and the focus lens unit 104 are respectively held by holding frames 105 and 106. The holding frames 105 and 106 are each guided by a guide member, configured to be movable in an optical axis direction, and driven by stepping motors 107 and 108. The stepping motors 107 and 108 respectively move the holding frames 105 and 106 in synchronization with a drive pulse. The image stabilization lens unit 103 reduces image blur attributed to camera shake such as hand shake, and stabilizes an image by moving in a direction having a component of a direction orthogonal to an optical axis of the imaging optical system.

A microcomputer 111 (also referred to as a lens microcomputer) functions as a control unit (lens or accessory control unit) that controls an operation of each unit in the interchangeable lens apparatus 100. The lens microcomputer 111 includes a communication unit 112 (lens or accessory communication unit), and receives a control command and a transmission request command from the camera main body 200 via the communication unit 112. The communication unit 112 includes a first communication path and a second communication path described below. The lens microcomputer 111 performs control corresponding to the control command, and transmits data corresponding to the transmission request command, to the camera main body 200 via the communication unit 112. The lens microcomputer 111 outputs drive signals to a zoom drive circuit 119 and a focus drive circuit 120 in response to commands related to zooming and focusing, and drives the stepping motors 107 and 108. In this manner, zoom processing is performed by the zoom lens unit 102, and focus processing (can be autofocus (AF) processing) is performed by the focus lens unit 104.

The aperture stop unit 114 includes diaphragm blades 114a and 114b. The states of the diaphragm blades 114a and 114b are detected by, for example, a hall element 115, and the output of the hall element 115 is input to the lens microcomputer 111 via an amplification circuit 122 and an analog-to-digital (A/D) conversion circuit 123. The lens microcomputer 111 outputs a drive signal to a diaphragm drive circuit 121 based on an input signal from the A/D conversion circuit 123, thereby driving a diaphragm actuator 113. In this manner, light amount adjustment processing is performed by the aperture stop unit 114.

The lens microcomputer 111 further outputs a drive signal to an image stabilization drive circuit 125 based on camera shake detected by a vibration sensor, such as a vibration gyro (gyroscope) sensor provided in the interchangeable lens apparatus 100, thereby driving an image stabilization actuator 126 (e.g., voice coil motor). In this manner, image stabilization processing is performed by the image stabilization lens unit 103.

The interchangeable lens apparatus 100 further includes an operation ring 130 and an operation ring detection unit 131. The operation ring detection unit 131 can include, for example, two photointerrupters that output two-phase signals in accordance with the rotation of the operation ring 130. The lens microcomputer 111 obtains an operation amount of the operation ring 130 based on the output of the operation ring detection unit 131. The lens microcomputer 111 also notifies a camera microcomputer 205 (described below) of an operation amount of the operation ring 130 via the communication unit 112.

The intermediate adapter 300 is, for example, an extender, and includes a magnification varying lens 301 (optical member) and a microcomputer 302 (also referred to as an adapter microcomputer). The adapter microcomputer 302 functions as a control unit (adapter or accessory control unit) that controls an operation of each unit in the intermediate adapter 300. The adapter microcomputer 302 includes a communication unit 303 (adapter or accessory communication unit) serving as an accessory communication unit, and receives a control command and a transmission request command from the camera main body 200 via the communication unit 303. The communication unit 303 includes the first communication path and the second communication path described below. The adapter microcomputer 302 performs control corresponding to the control command, and transmits data corresponding to the transmission request command, to the camera main body 200 via the communication unit 303.

The camera main body 200 includes an image sensor 201 (also referred to as an image pickup element), such as a charge-coupled device (CCD) image sensor or a complementary metal-oxide semiconductor (CMOS) image sensor, an A/D conversion circuit 202, a signal processing circuit 203, a recording unit 204, the microcomputer (referred to as a camera microcomputer) 205, and a display unit 206. The image sensor 201 captures (photoelectrically-converts) an object image formed by the imaging optical system included in the interchangeable lens apparatus 100, and outputs an electrical signal (analog signal). The A/D conversion circuit 202 converts the analog signal into a digital signal. The signal processing circuit 203 generates a video signal by performing image processing on the digital signal. The signal processing circuit 203 also generates, based on the video signal, focus information regarding contrast of an object image (focus state of imaging optical system), and exposure information regarding brightness of the object image. The signal processing circuit 203 outputs the video signal to the display unit 206. The display unit 206 displays, based on the video signal, a live view image to be used for checking a composition or a focus state.

The camera microcomputer 205 functions as a control unit (camera control unit) that controls each unit included in the camera main body 200 based on an input from an operation member, such as an image capturing instruction switch or various setting switches. The camera microcomputer 205 also includes a communication unit 208 (camera communication unit), and transmits a control command to the lens microcomputer 111 via the communication unit 208. The communication unit 208 includes the first communication path and the second communication path described below. The control command may include a command related to a zoom operation of the zoom lens unit 102 that is based on an operation of a zoom switch. The control command may also include a command related to a light amount adjustment operation of the aperture stop unit 114 that is based on brightness information. The control command may also include a command related to a focusing adjustment operation of the focus lens unit 104 that is based on contrast information. The camera microcomputer 205 also transmits a transmission request command for acquiring control information and state information of the interchangeable lens apparatus 100 and the intermediate adapter 300, to the lens microcomputer 111 and the adapter microcomputer 302 via the communication unit 208.

Figure 2:
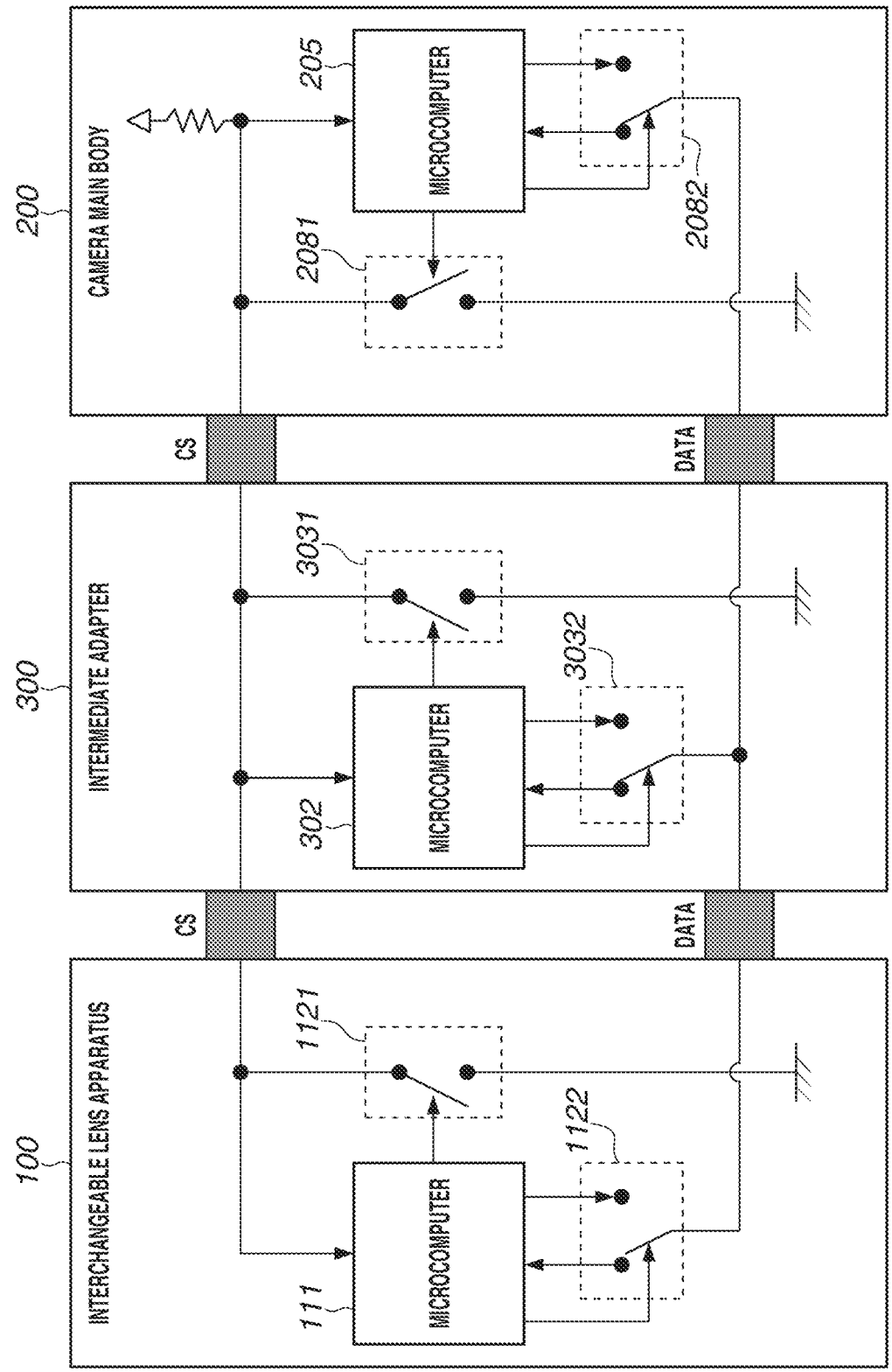
FIG. 2 is a block diagram illustrating a configuration example of a communication circuit in an imaging system.

Hereinafter, a communication circuit in the imaging system including the camera main body 200, the interchangeable lens apparatus 100, and the intermediate adapter 300 will be described with reference to FIG. 2. FIG. 2 is a diagram illustrating a configuration example of the communication circuit in the imaging system. The camera microcomputer 205, the lens microcomputer 111, and the adapter microcomputer 302 communicate using signal lines connected via the communication terminal units provided on the mounts 400 and 401. The signal lines include a signal line CS (notification channel; first communication channel; first communication path) that carries a signal for performing flow control of communication, and is used for a notification of a communication timing. The signal lines also include a signal line DATA (data communication channel; second communication channel; second communication path) that carries data, and is used for data communication.

The signal line CS is connected to the camera microcomputer 205, the lens microcomputer 111, and the adapter microcomputer 302, and each microcomputer can detect a signal level (voltage level) in the signal line. The signal line CS is pull-up connected to a power supply in the camera main body 200. The signal line CS can further be connected to GND (earthed or grounded) via a ground switch 1121 of the interchangeable lens apparatus 100, a ground switch 2081 of the camera main body 200, and a ground switch 3031 of the intermediate adapter 300. In other words, the signal line CS is connected to an open drain. With this configuration, the interchangeable lens apparatus 100, the camera main body 200, and the intermediate adapter 300 can each set a signal level of the signal line CS to Lo (Low; first level) by turning on (connecting) each ground switch. In contrast, a signal level of the signal line CS can be set to Hi (High; second level), by all of the interchangeable lens apparatus 100, the camera main body 200, and the intermediate adapter 300 turning off (blocking) the respective connection switches. The content of control signals carried on the signal line CS and details of a processing procedure will be described below.

The signal line DATA can be a single bidirectional data transmission line that can be used while changing a data carrying direction. The signal line DATA can connect to the lens microcomputer 111 via an input-output changeover switch 1122 included in the interchangeable lens apparatus 100. The signal line DATA can also connect to the camera microcomputer 205 via an input-output changeover switch 2082 included in the camera main body 200. The signal line DATA can also connect to the adapter microcomputer 302 via an input-output changeover switch 3032 included in the intermediate adapter 300. Each microcomputer includes a data output unit (CMOS method) for transmitting data, and a data input unit (CMOS method) for receiving data. Each microcomputer can select whether to connect the signal line DATA to the data output unit or the data input unit, by operating an input-output changeover switch. With this configuration, the interchangeable lens apparatus 100, the camera main body 200, and the intermediate adapter 300 can perform data transmission by operating the respective input-output changeover switches to connect the signal line DATA to the data output units. On the other hand, the interchangeable lens apparatus 100, the camera main body 200, and the intermediate adapter 300 can perform data reception by operating the respective input-output changeover switches to connect the signal line DATA to the data input units. The details of an operation procedure of the input-output changeover switch will be described below.

FIG. 2 illustrates a configuration example of the communication circuit, but the configuration of the communication circuit is not limited to this. For example, the signal line CS may be pull-down connected to GND inside the camera main body 200, and connected to a power supply (not illustrated) via the ground switches 1121, 2081, and 3031. The signal line DATA may be always connected to the respective data input units of the microcomputers, and the microcomputers may be made selectively connectable to the respective data output units via switches.

<Communication Data Format>

Figure 3:
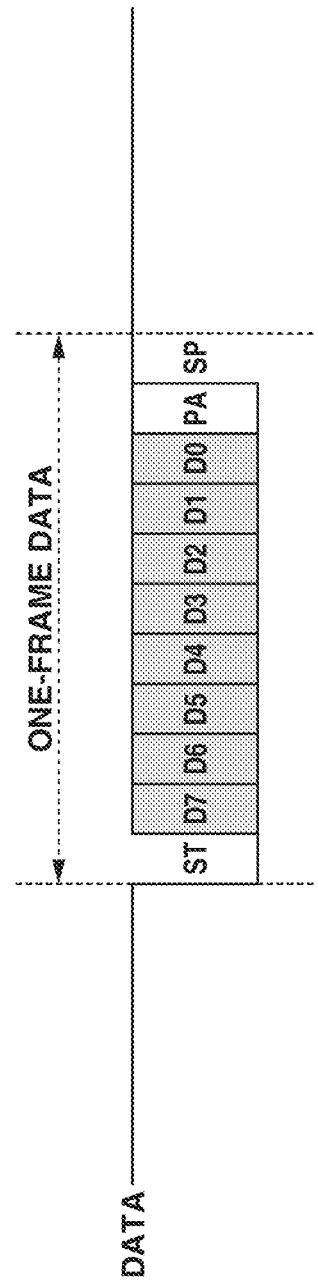
FIG. 3 is a diagram exemplifying a format of communication data.

A format of communication data to be exchanged between the camera microcomputer 205, the lens microcomputer 111, and the adapter microcomputer 302 will be described with reference to FIG. 3. FIG. 3 is a diagram exemplifying a format of communication data to be transmitted and received using the signal line DATA. The format is a format common to those used in broadcast communication and peer-to-peer (P2P) communication described below. The format of communication data is based on so-called asynchronous communication of performing transmission and reception at a predetermined communication bit rate. In a non-transmission state in which data transmission is not being performed, a signal level is maintained at Hi. For notifying a data reception side of a data transmission start, a signal level is set to Lo for a one-bit period (start bit ST). In the following eight-bit period from the second bit to the ninth bit, one-byte data is transmitted. A bit array of data starts from most significant data D7 followed by data D6, data D5, and so on, and ends with least significant data D0, as a most significant bit (MSB) first format. One-bit parity information PA (parity bit) is added to the following tenth bit. Lastly, for notifying a reception side of a data transmission end, the signal level is set to Hi for a one-bit period (stop bit SP). By the stop bit SP, a transmission period of one-frame data that has been started by the start bit ST ends. FIG. 3 exemplifies a format of communication data, but a format of communication data is not limited to this. For example, a bit array of data may be a least significant bit (LSB) first format. Alternatively, data may have a nine-bit length. Alternatively, the format of communication data needs not include the parity information PA. Alternatively, the format of communication data may be varied from that used in broadcast communication and P2P communication described below.

<Broadcast Communication Method (First Communication Method)>

Figure 4:
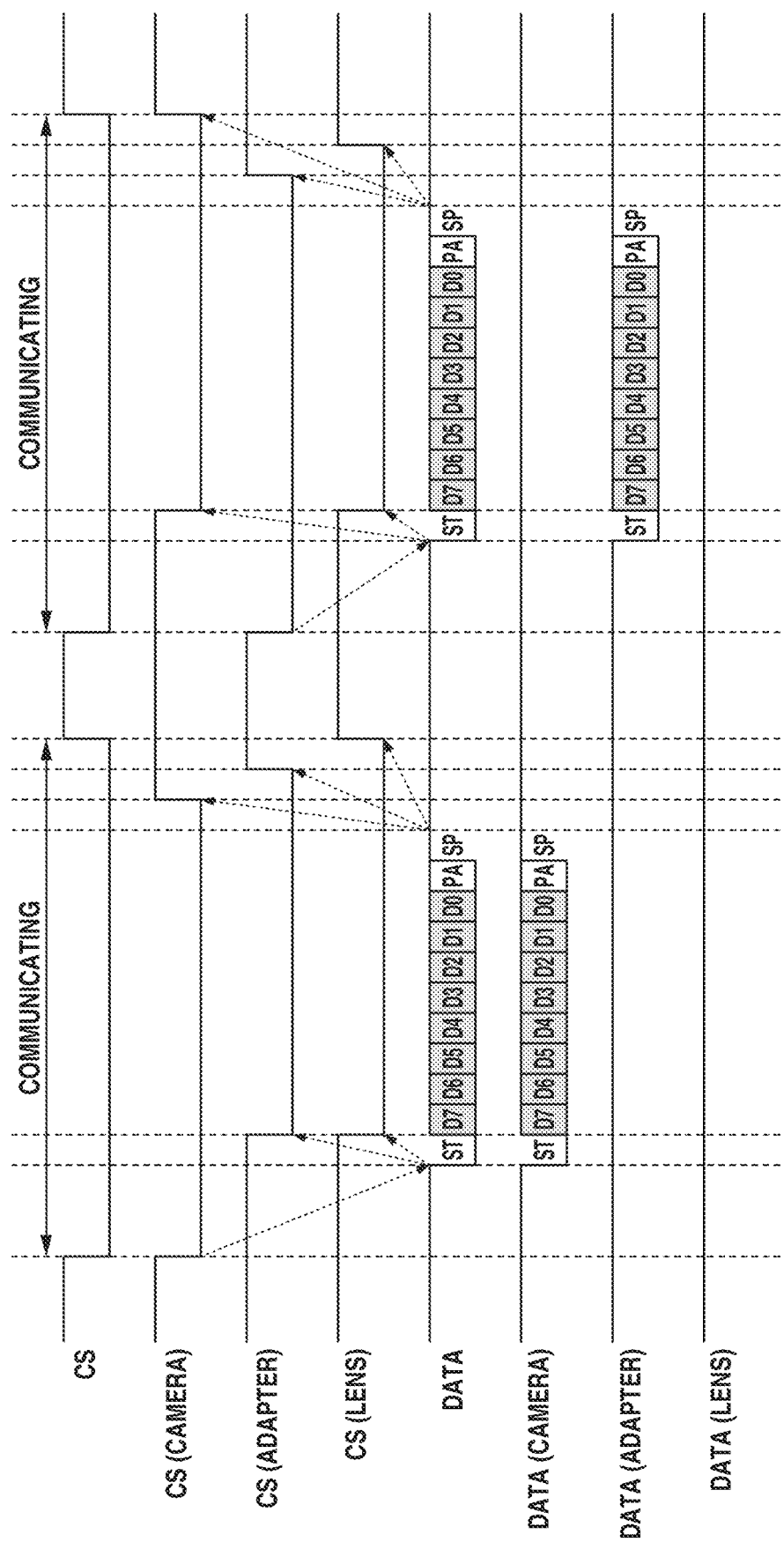
FIG. 4 is a diagram exemplifying a signal waveform in broadcast communication.

Broadcast communication to be performed between the camera microcomputer 205, the lens microcomputer 111, and the adapter microcomputer 302 will be described with reference to FIG. 4. FIG. 4 is a diagram exemplifying a signal waveform in broadcast communication. The broadcast communication method (first communication method) is a communication method of concurrently transmitting data (performing one-to-many concurrent delivery) from one microcomputer of the camera microcomputer 205, the lens microcomputer 111, and the adapter microcomputer 302 to a plurality of other microcomputers. FIG. 4 exemplifies a case where broadcast communication is performed from the adapter microcomputer 302 to the camera microcomputer 205 and the lens microcomputer 111 in response to broadcast communication from the camera microcomputer 205 to the lens microcomputer 111 and the adapter microcomputer 302.

First, the camera microcomputer 205 serving as a communication main device starts a Lo output (an output of Lo level signal) to the signal line CS for notifying the lens microcomputer 111 and the adapter microcomputer 302 serving as communication sub devices, that broadcast communication is to be started. The camera microcomputer 205 then outputs data to be transmitted, to the signal line DATA. In contrast, the lens microcomputer 111 and the adapter microcomputer 302 start the Lo output to the signal line CS, in a case where the lens microcomputer 111 and the adapter microcomputer 302 detect the start bit ST input from the signal line DATA. At this time point, the camera microcomputer 205 has already started the Lo output to the signal line CS. Thus, the signal level of the signal line CS does not change.

After the camera microcomputer 205 ends the output of data up to the stop bit SP, the camera microcomputer 205 cancels the Lo output to the signal line CS. That is, the camera microcomputer 205 switches the output to a Hi output (an output of Hi level signal) to the signal line CS. In contrast, after the lens microcomputer 111 and the adapter microcomputer 302 end the reception of data up to the stop bit SP that has been input from the signal line DATA, the lens microcomputer 111 and the adapter microcomputer 302 perform analysis of received data and internal processing associated with the received data. Thereafter, the lens microcomputer 111 and the adapter microcomputer 302 make arrangements for receiving next data, and then cancel the Lo output to the signal line CS. As described above, the signal level of the signal line CS is set to Hi by all of the camera microcomputer 205, the lens microcomputer 111, and the adapter microcomputer 302 canceling the Lo output to the signal line CS. Thus, it can be determined that all microcomputers have ended processing related to current communication and made arrangements for performing next communication, by checking that the signal level of the signal line CS is set to Hi.

After the adapter microcomputer 302 confirms that the signal level of the signal line CS has returned to Hi, the adapter microcomputer 302 starts the Lo output to the signal line CS for notifying the camera microcomputer 205 and the lens microcomputer 111 that broadcast communication is to be started. The adapter microcomputer 302 then outputs data to be transmitted, to the signal line DATA. In contrast, the camera microcomputer 205 and the lens microcomputer 111 start the Lo output to the signal line CS when the camera microcomputer 205 and the lens microcomputer 111 detect the start bit ST input from the signal line DATA. At this time point, the adapter microcomputer 302 has already started the Lo output to the signal line CS. Thus, the signal level of the signal line CS does not change.

After the adapter microcomputer 302 ends the output of data up to the stop bit SP, the camera microcomputer 205 cancels the Lo output to the signal line CS. In contrast, the camera microcomputer 205 and the lens microcomputer 111 perform analysis of received data and internal processing associated with the received data, after the camera microcomputer 205 and the lens microcomputer 111 end the reception of data up to the stop bit SP that has been input from the signal line DATA. Thereafter, the camera microcomputer 205 and the lens microcomputer 111 make arrangements for receiving next data, and then cancel the Lo output to the signal line CS.

As described above, a signal to be carried via the signal line CS in broadcast communication functions as a control signal indicating that broadcast communication and internal processing related to the communication are being executed.

FIG. 4 exemplifies a signal waveform in broadcast communication, but the signal waveform is not limited to this.

For example, an amount of data to be transmitted in one broadcast communication may be set to two or three bytes instead of one byte. In addition, broadcast communication may be limited to one-way communication from the camera microcomputer 205 serving as a communication main device, to the lens microcomputer 111 and the adapter microcomputer 302 serving as communication sub devices.

<P2P Communication Method (Second Communication Method)>

Figure 5:
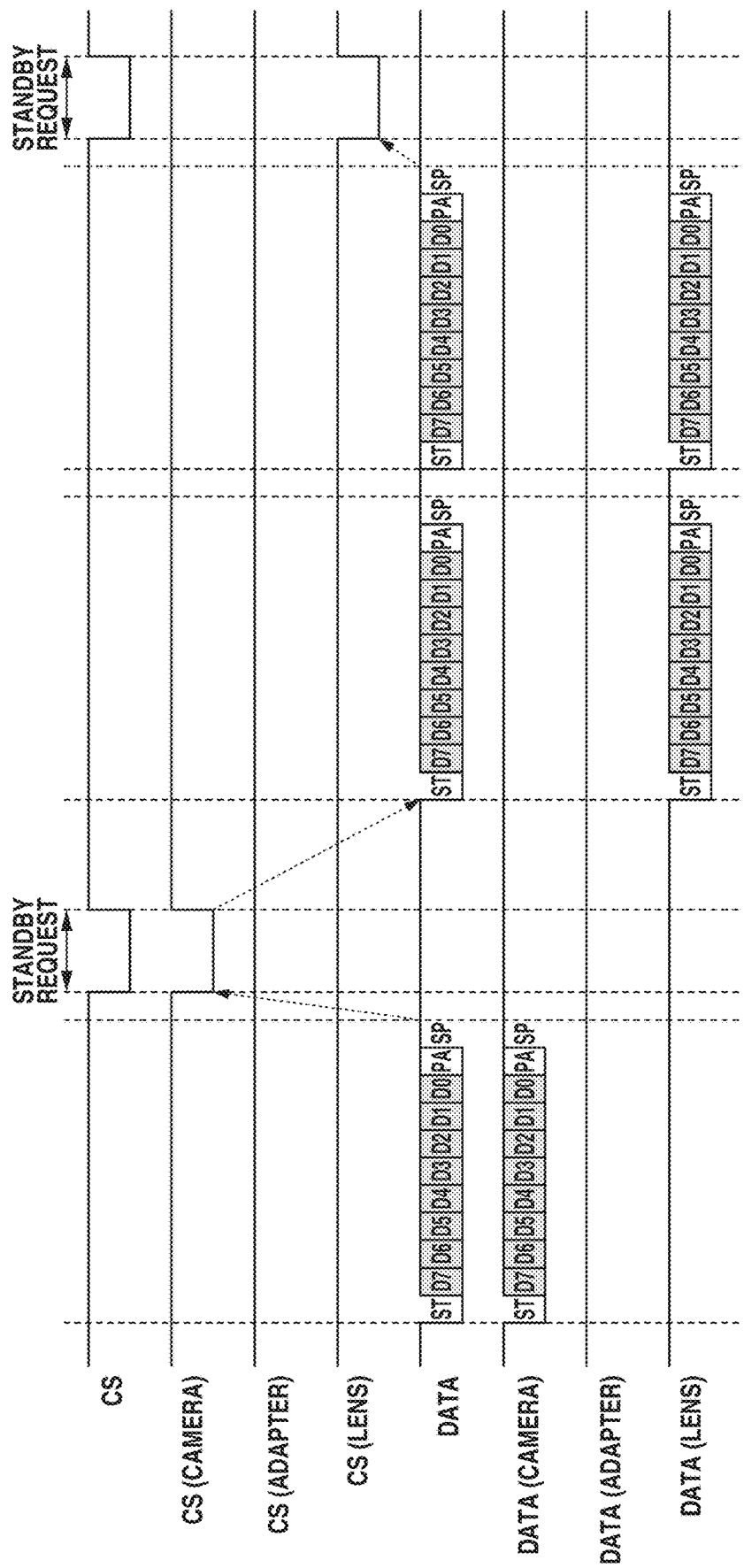
FIG. 5 is a diagram exemplifying a signal waveform in peer-to-peer (P2P) communication.

P2P communication to be performed between the camera microcomputer 205, the lens microcomputer 111, and the adapter microcomputer 302 will be described with reference to FIG. 5. FIG. 5 is a diagram exemplifying a signal waveform in P2P communication. The second communication method is a communication method of performing data transmission and reception (bidirectional communication) (performing one-to-one individual communication) between the camera microcomputer 205, and only one microcomputer, which is designated by the camera microcomputer 205, out of the lens microcomputer 111 and the adapter microcomputer 302. FIG. 5 illustrates a case where the lens microcomputer 111 is designated by the camera microcomputer 205 as a communication partner. FIG. 5 also illustrates a case where two-byte data transmission is performed from the lens microcomputer 111 to the camera microcomputer 205 in response to one-byte data transmission from the camera microcomputer 205 to the lens microcomputer 111. A procedure of designating or switching a communication partner will be described below.

First, the camera microcomputer 205 serving as a communication main device outputs data to be transmitted, to the signal line DATA. The camera microcomputer 205 starts the Lo output to the signal line CS, after the camera microcomputer 205 ends the output of data up to the stop bit SP. Thereafter, the camera microcomputer 205 makes arrangements for receiving next data, and then cancels the Lo output to the signal line CS. After the lens microcomputer 111 detects a Lo signal input from the signal line CS, the lens microcomputer 111 performs analysis of received data input from the signal line DATA, and internal processing associated with the received data. After the lens microcomputer 111 confirms that the signal level of the signal line CS has returned to Hi, the lens microcomputer 111 outputs, to the signal line DATA, data to be transmitted in two consecutive bytes. After the lens microcomputer 111 ends the output of data up to the stop bit SP of the second byte, the lens microcomputer 111 starts the Lo output to the signal line CS. Thereafter, the lens microcomputer 111 makes arrangements for receiving next data, and then cancels the Lo output to the signal line CS. The adapter microcomputer 302 not designated as a communication partner in P2P communication does not perform an operation on the signal line CS and the signal line DATA.

As described above, a signal to be carried via the signal line CS in P2P communication functions as a control signal indicating a transmission end on a transmission side and a standby request of next data transmission. FIG. 5 exemplifies a signal waveform in P2P communication, but the signal waveform is not limited to this. For example, an amount of data to be transmitted in one P2P communication may be one byte or three bytes or more instead of two bytes.

<Switching of Communication Method>

Figure 6:
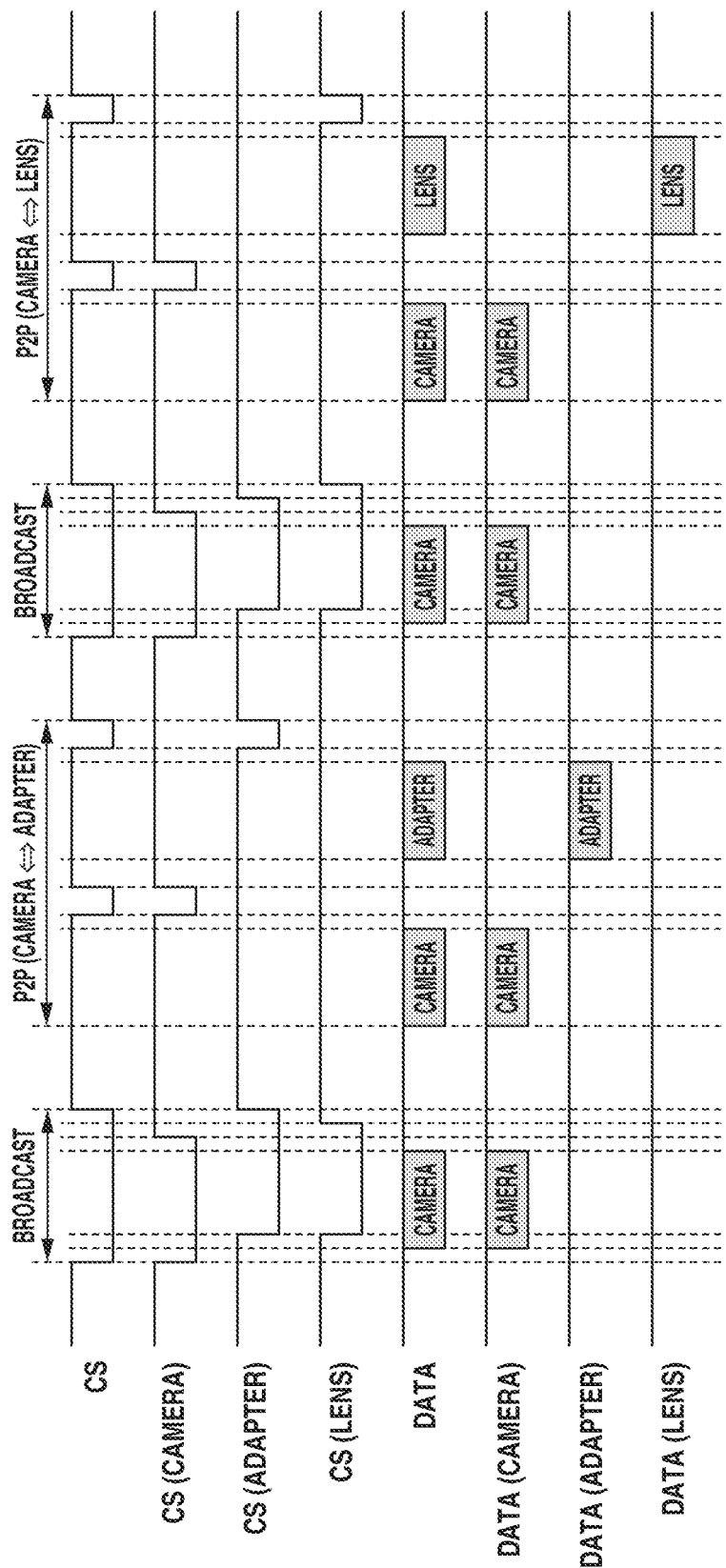
FIG. 6 is a diagram exemplifying a signal waveform obtained in a case where a communication method is switched.

Switching between broadcast communication and P2P communication performed between the camera microcomputer 205, the lens microcomputer 111, and the adapter microcomputer 302, and a designation method of a communication partner in P2P communication will be described with reference to FIG. 6. FIG. 6 is a diagram exemplifying a signal waveform obtained in a case where a communication method is switched. The designation of a communication partner in P2P communication is performed by broadcast communication. In the following description, the transmission from the camera microcomputer 205 and a return from the adapter microcomputer 302 are executed by P2P communication, after the adapter microcomputer 302 is designated by the camera microcomputer 205 as a communication partner in P2P communication. Subsequently, the transmission from the camera microcomputer 205 and a return from the lens microcomputer 111 are executed by P2P communication, after the lens microcomputer 111 is designated by the camera microcomputer 205 as a communication partner in P2P communication.

First, the camera microcomputer 205 serving as a communication main device executes broadcast communication in accordance with a procedure described with reference to FIG. 4. Data to be notified (transmitted) in this broadcast communication is sub device designation data (communication partner designation data) for designating a partner that communicates with the camera microcomputer 205 in the following P2P communication. The lens microcomputer 111 and the adapter microcomputer 302 serving as communication sub devices each determine whether the lens microcomputer 111 and the adapter microcomputer 302 have been designated as a communication partner in P2P communication, based on the sub device designation data received in broadcast communication. In the camera microcomputer 205 and the designated communication sub device, communication switches from broadcast communication to P2P communication by the broadcast communication. Since the adapter microcomputer 302 is designated as a communication partner in this case, data transmission and reception are performed by P2P communication between the camera microcomputer 205 and the adapter microcomputer 302 in accordance with the procedure described with reference to FIG. 5. As described above, the camera microcomputer 205 first transmits data to the adapter microcomputer 302, and then, the adapter microcomputer 302 transmits data to the camera microcomputer 205.

When P2P communication between the camera microcomputer 205 and the adapter microcomputer 302 ends, the camera microcomputer 205 designates, by using broadcast communication, the lens microcomputer 111 as a communication partner in P2P communication. By the broadcast communication, the adapter microcomputer 302 ends P2P communication, and the lens microcomputer 111 switches from broadcast communication to P2P communication. If broadcast communication is not executed, P2P communication between the camera microcomputer 205 and the adapter microcomputer 302 is continued. In this example, the above-described broadcast communication is executed, and thereby data transmission and reception are performed by P2P communication between the camera microcomputer 205 and the lens microcomputer 111 in accordance with the procedure described with reference to FIG. 5. As described above, the camera microcomputer 205 first transmits data to the lens microcomputer 111, and then, the lens microcomputer 111 transmits data to the camera microcomputer 205.

<Processing Flow of Broadcast Communication and P2P Communication>

Figure 7:
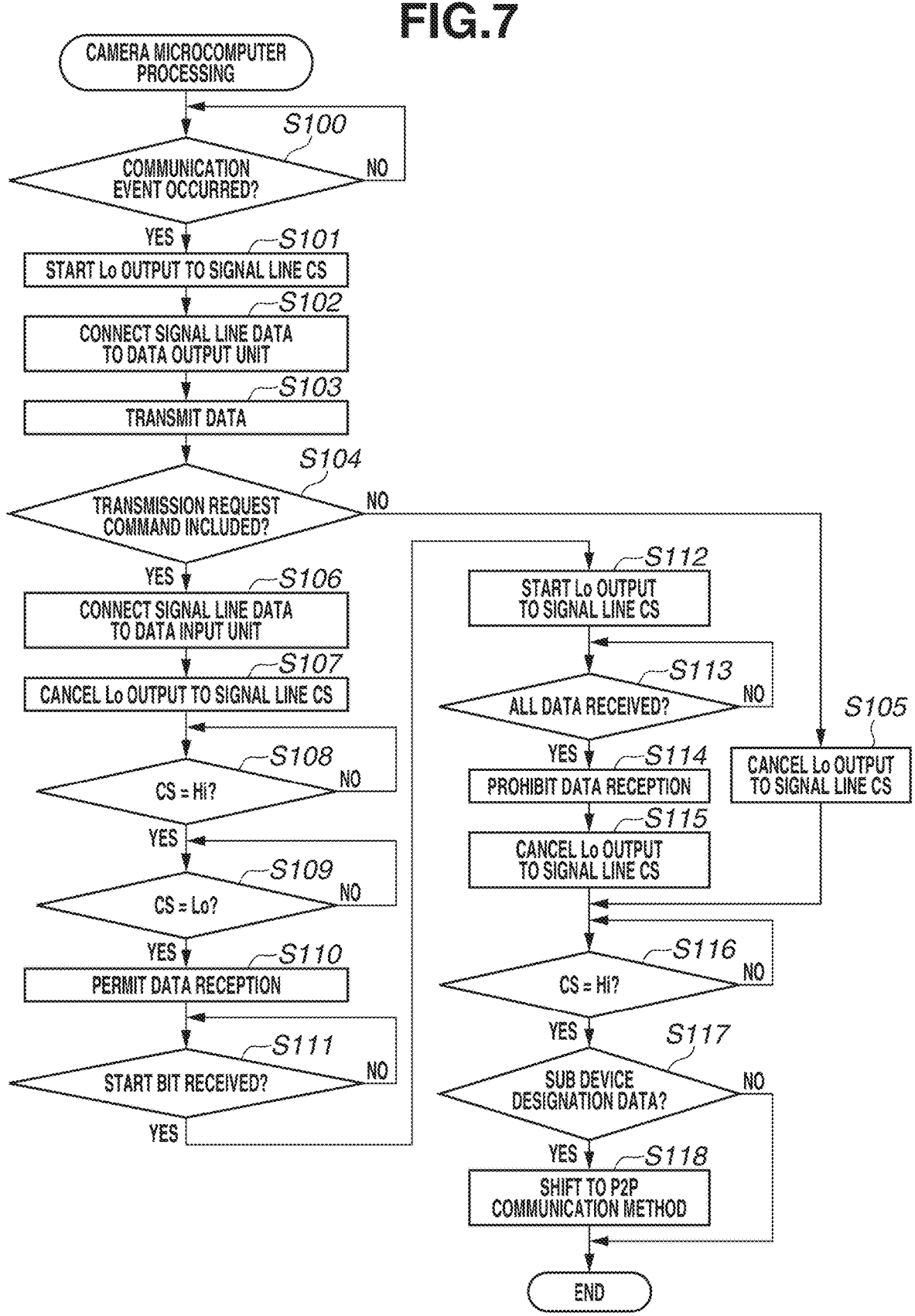
FIG. 7 is a diagram exemplifying a processing flow performed by a communication main device in broadcast communication.
Figure 8:
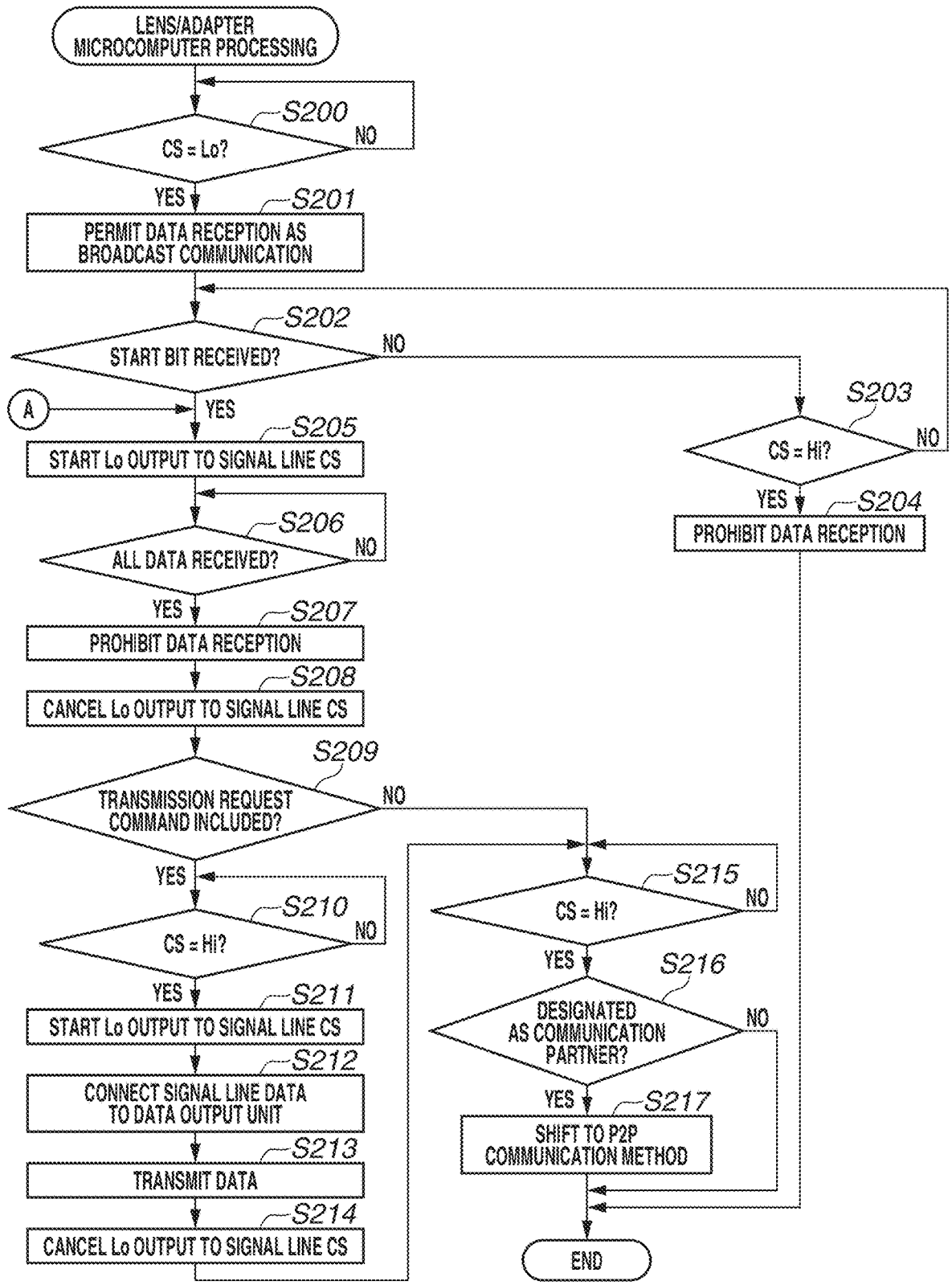
FIG. 8 is a diagram exemplifying a processing flow performed by a communication sub device in broadcast communication.

A procedure (processing flow) of broadcast communication and P2P communication performed between the camera microcomputer 205, the lens microcomputer 111, and the adapter microcomputer 302 will be described. A processing flow in broadcast communication will be described with reference to FIGS. 7 and 8. FIG. 7 is a diagram exemplifying a processing flow to be performed by a communication main device in broadcast communication. FIG. 8 is a diagram exemplifying a processing flow to be performed by a communication sub device in broadcast communication.

A processing flow to be performed by the camera microcomputer 205 serving as a communication main device will be described. In step S100, the camera microcomputer 205 determines whether an event starting broadcast communication has occurred. In a case where the event has occurred (YES in step S100), the processing proceeds to step S101. In a case where the event has not occurred (NO in step S100), the processing in step S100 is repeated.

In step S101, the camera microcomputer 205 turns on (connects) the ground switch 2081 and starts the Lo output to the signal line CS. The lens microcomputer 111 and the adapter microcomputer 302 are thereby notified of a start of broadcast communication.

In step S102, the camera microcomputer 205 operates the input-output changeover switch 2082 and connects the signal line DATA to the data output unit of the camera microcomputer 205.

In step S103, the camera microcomputer 205 starts data transmission.

In step S104, the camera microcomputer 205 determines whether the data transmitted in step S103 includes a transmission request command. The transmission request command is a command for requesting a communication sub device that has received data transmitted from the camera microcomputer 205 serving as a communication main device, to transmit data to the camera microcomputer 205. In a case where the transmission request command is included (YES in step S104), the processing proceeds to step S106. In a case where the transmission request command is not included (NO in step S104), the processing proceeds to step S105.

In step S105, the camera microcomputer 205 turns off (blocks) the ground switch 2081 and cancels the Lo output to the signal line CS.

In step S106, the camera microcomputer 205 operates the input-output changeover switch 2082 and connects the signal line DATA to the data input unit of the camera microcomputer 205.

In step S107, the camera microcomputer 205 turns off (blocks) the ground switch 2081 and cancels the Lo output to the signal line CS.

In step S108, the camera microcomputer 205 determines whether the signal level of the signal line CS is Hi. In a case where the signal level is Hi (YES in step S108), the processing proceeds to step S109. In a case where the signal level is not Hi (NO in step S108), the processing in step S108 is repeated.

In step S109, the camera microcomputer 205 determines whether the signal level of the signal line CS is Lo. In a case where the signal level is Lo (YES in step S109), the processing proceeds to step S110. In a case where the signal level is not Lo (NO in step S109), the processing in step S109 is repeated.

In step S110, the camera microcomputer 205 permits data reception from the signal line DATA.

In step S111, the camera microcomputer 205 determines whether the reception of a start bit from the signal line DATA has been detected. In a case where the reception of a start bit has been detected (YES in step S111), the processing proceeds to step S112. In a case where the reception of a start bit has not been detected (NO in step S111), the processing in step S111 is repeated.

In step S112, the camera microcomputer 205 turns on (connects) the ground switch 2081 and starts the Lo output to the signal line CS.

In step S113, the camera microcomputer 205 determines whether all pieces of data have been received. In a case where all pieces of data have been received (YES in step S113), the processing proceeds to step S114. In a case where all pieces of data have not been received (NO in step S113), the processing in step S113 is repeated.

In step S114, the camera microcomputer 205 prohibits data reception from the signal line DATA.

In step S115, the camera microcomputer 205 turns off (blocks) the ground switch 2081 and cancels the Lo output to the signal line CS.

In step S116, the camera microcomputer 205 determines whether the signal level of the signal line CS is Hi. In a case where the signal level is Hi (YES in step S116), the processing proceeds to step S117. In a case where the signal level is not Hi (NOT in step S116), the processing in step S116 is repeated.

In step S117, the camera microcomputer 205 determines whether the data transmitted in step S103 is sub device designation data designating a communication partner. In a case where the data is sub device designation data (YES in step S117), the processing proceeds to step S118. In a case where the data is not sub device designation data (NO in step S117), the processing ends.

In step S118, the camera microcomputer 205 shifts the communication method to the P2P communication method from the broadcast communication method.

A processing flow of the adapter microcomputer 302 serving as a communication sub device will now be described. Since a processing flow of the lens microcomputer 111 serving as a communication sub device is similar to the processing flow of the adapter microcomputer 302, the description will be omitted.

In step S200, the adapter microcomputer 302 determines whether the signal level of the signal line CS is Lo. In a case where the signal level is Lo (YES in step S200), the processing proceeds to step S201. In a case where the signal level is not Lo (NO in step S200), the processing in step S200 is repeated.

In step S201, the adapter microcomputer 302 permits data reception from the signal line DATA as broadcast communication.

In step S202, the adapter microcomputer 302 determines whether the reception of a start bit from the signal line DATA has been detected. In a case where the reception of a start bit has been detected (YES in step S202), the processing proceeds to step S205. In a case where the reception of a start bit has not been detected (NO in step S202), the processing proceeds to step S203.

In step S203, the adapter microcomputer 302 determines whether the signal level of the signal line CS is Hi. In a case where the signal level is Hi (YES in step S203), the processing proceeds to step S204. In a case where the signal level is not Hi (NO in step S203), the processing returns to step S202.

In step S204, the adapter microcomputer 302 prohibits data reception from the signal line DATA.

The purpose of performing the processing in steps S203 and S204 is to deal with a situation in which P2P communication is performed between the camera microcomputer 205 and the lens microcomputer 111, and only the adapter microcomputer 302 performs broadcast communication. In this situation, the adapter microcomputer 302 does not receive data from the camera microcomputer 205.

In step S205, the adapter microcomputer 302 turns on (connects) the ground switch 3031 and starts the Lo output to the signal line CS.

In step S206, the adapter microcomputer 302 determines whether all pieces of data have been received. In a case where all pieces of data have been received (YES in step S206), the processing proceeds to step S207. In a case where all pieces of data have not been received (NO in step S206), the processing in step S206 is repeated.

In step S207, the adapter microcomputer 302 prohibits data reception from the signal line DATA.

In step S208, the adapter microcomputer 302 turns off (blocks) the ground switch 3031 and cancels the Lo output to the signal line CS.

In step S209, the adapter microcomputer 302 determines whether the data received in step S206 includes a transmission request command. In a case where the transmission request command is included (YES in step S209), the processing proceeds to step S210. In a case where the transmission request command is not included (NO in step S209), the processing proceeds to step S215.

In step S210, the adapter microcomputer 302 determines whether the signal level of the signal line CS is Hi. In a case where the signal level is Hi (YES in step S210), the processing proceeds to step S211. In a case where the signal level is not Hi (NO in step S210), the processing in step S210 is repeated.

In step S211, the adapter microcomputer 302 turns on (connects) the ground switch 3031 and starts the Lo output to the signal line CS.

In step S212, the adapter microcomputer 302 operates the input-output changeover switch 3032 and connects the signal line DATA to the data output unit of the adapter microcomputer 302.

In step S213, the adapter microcomputer 302 starts data transmission.

In step S214, the adapter microcomputer 302 turns off (blocks) the ground switch 3031 and cancels the Lo output to the signal line CS.

In step S215, the adapter microcomputer 302 determines whether the signal level of the signal line CS is Hi. In a case where the signal level is Hi (YES in step S215), the processing proceeds to step S216. In a case where the signal level is not Hi (NO in step S215), the processing in step S215 is repeated.

In step S216, the adapter microcomputer 302 determines whether the data received in step S206 is sub device designation data and the adapter microcomputer 302 has been designated as a communication partner of the camera microcomputer 205 in P2P communication. In a case where the data is sub device designation data and the adapter microcomputer 302 has been designated as the communication partner (YES in step S216), the processing proceeds to step S217. In a case where the data is not sub device designation data or in a case where the adapter microcomputer 302 is not designated as the communication partner (NO in step S216), the processing ends.

In step S217, the adapter microcomputer 302 shifts the communication method to the P2P communication method from the broadcast communication method.

Figure 9:
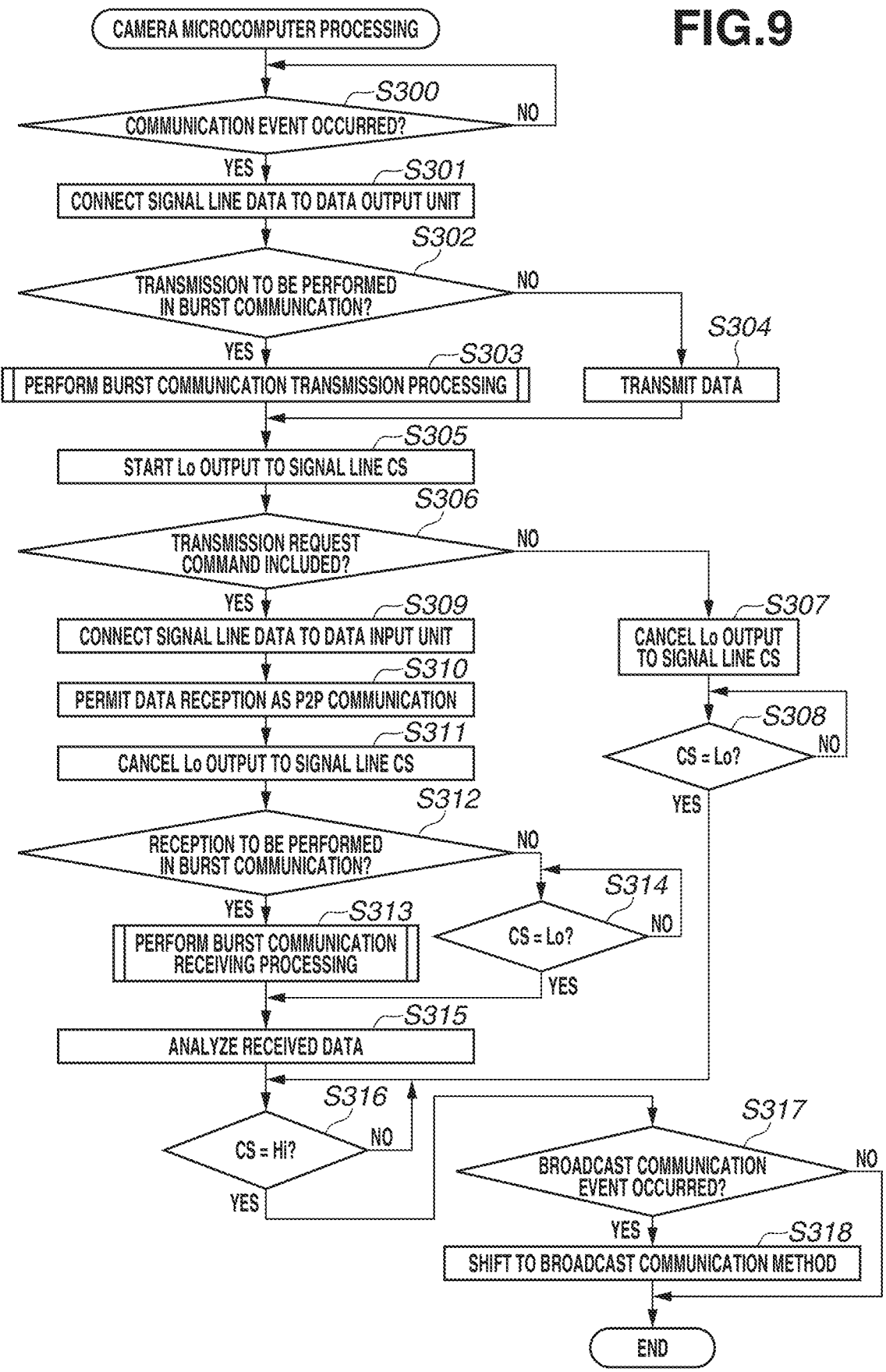
FIG. 9 is a diagram exemplifying a processing flow of a communication main device in P2P communication.
Figure 10A:
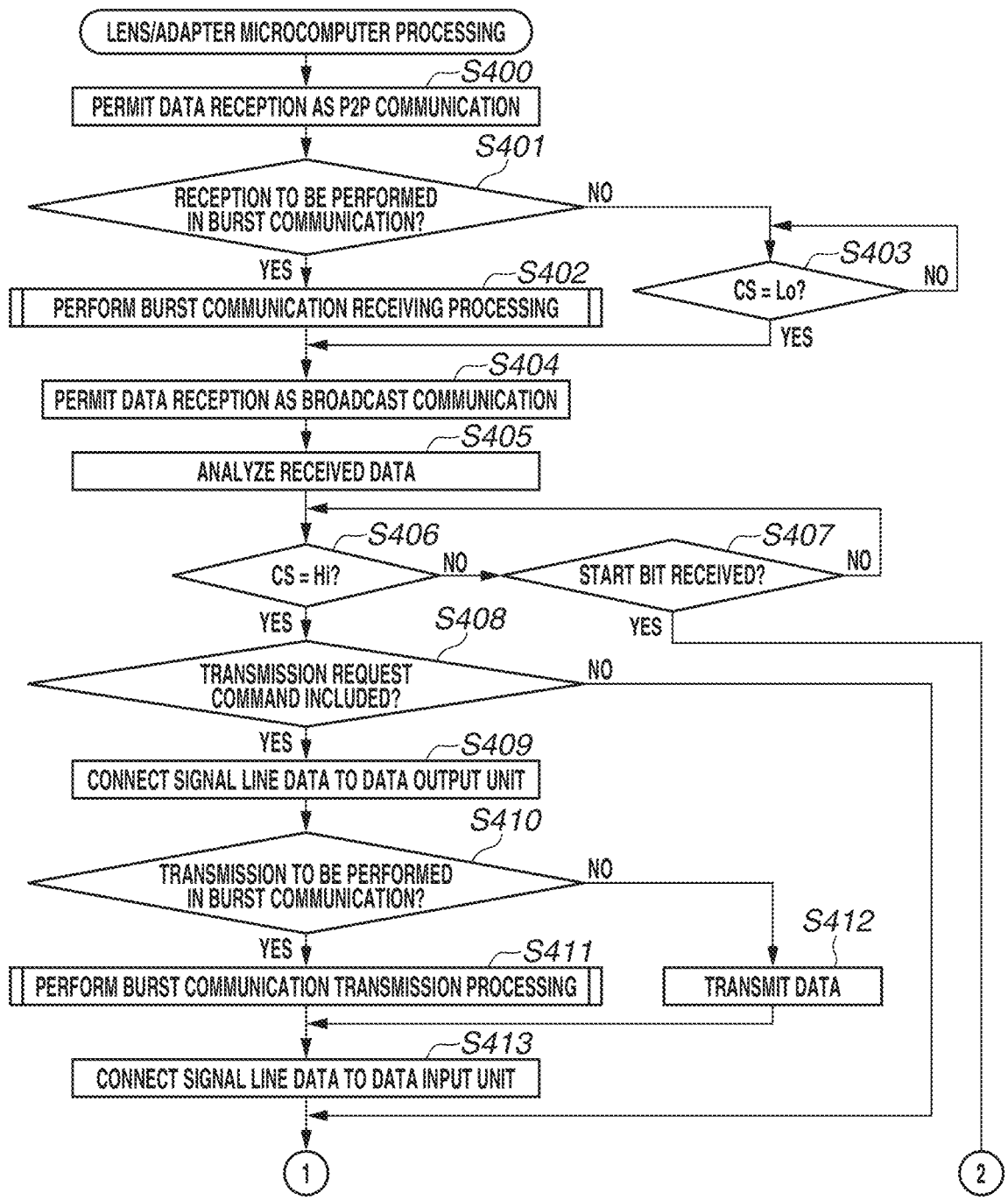
FIGS. 10A and 10B are a diagram exemplifying a processing flow performed by a communication sub device in P2P communication.
Figure 10B:
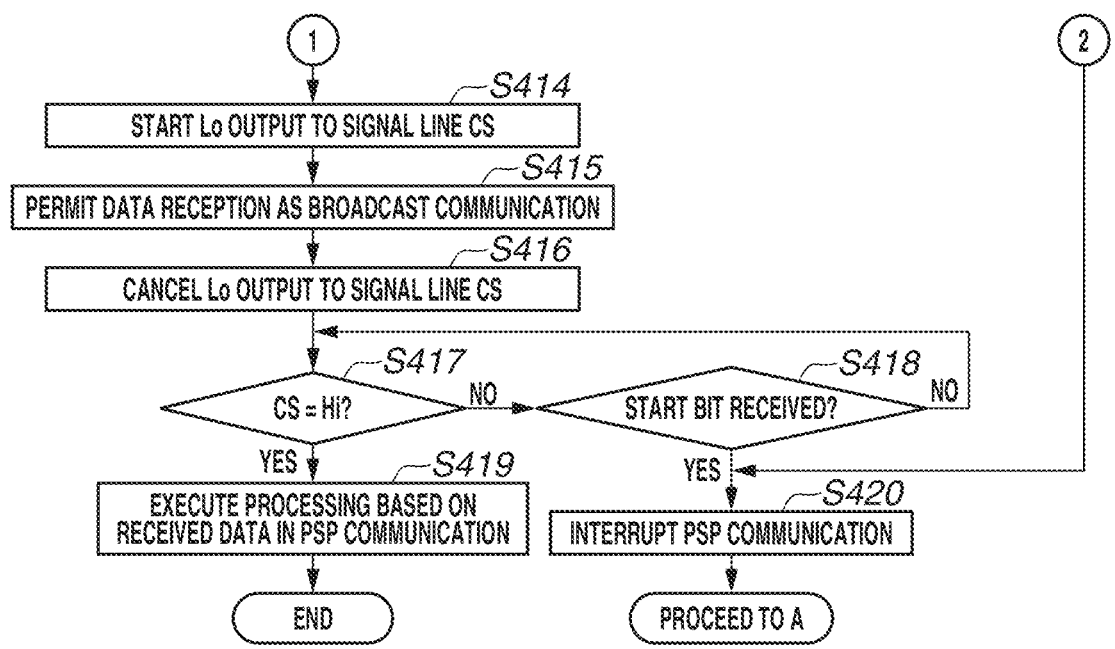

A flow of processing in normal P2P communication will be described with reference to FIGS. 9, 10A and 10B. FIG. 9 is a diagram exemplifying a processing flow of a communication main device in P2P communication. FIGS. 10A and 10B illustrate a diagram exemplifying a processing flow of a communication sub device in P2P communication.

First, a processing flow of the camera microcomputer 205 serving as a communication main device will be described. In step S300, the camera microcomputer 205 determines whether an event starting P2P communication has occurred. In a case where the event has occurred (YES in step S300), the processing proceeds to step S301. In a case where the event has not occurred (NO in step S300), the processing in step S300 is repeated.

In step S301, the camera microcomputer 205 operates the input-output changeover switch 2082 and connects the signal line DATA to the data output unit of the camera microcomputer 205.

In step S302, the camera microcomputer 205 determines whether transmission in P2P burst communication performed by the communication main device is to be performed. In a case where the transmission is to be performed (YES in step S302), the processing proceeds to step S303. In a case where the transmission is not to be performed (NO in step S302), the processing proceeds to step S304.

In step S303, the camera microcomputer 205 performs the transmission in P2P burst communication performed by the communication main device, and then, the processing proceeds to step S305. The details of the transmission in P2P burst communication performed by the communication main device will be described below.

In step S304, the camera microcomputer 205 starts data transmission.

In step S305, the camera microcomputer 205 turns on (connects) the ground switch 2081 and starts the Lo output to the signal line CS.

In step S306, the camera microcomputer 205 determines whether the data transmitted in step S304 includes a transmission request command. In a case where the transmission request command is included (YES in step S306), the processing proceeds to step S309. In a case where the transmission request command is not included (NO in step S306), the processing proceeds to step S307.

In step S307, the camera microcomputer 205 turns off (blocks) the ground switch 2081 and cancels the Lo output to the signal line CS.

In step S308, the camera microcomputer 205 determines whether the signal level of the signal line CS is Lo. In a case where the signal level is Lo (YES in step S308), the processing proceeds to step S316. In a case where the signal level is not Lo (NO in step S308), the processing in step S308 is repeated.

In step S309, the camera microcomputer 205 operates the input-output changeover switch 2082 and connects the signal line DATA to the data input unit of the camera microcomputer 205.

In step S311, the camera microcomputer 205 turns off (blocks) the ground switch 2081 and cancels the Lo output to the signal line CS.

In step S312, the camera microcomputer 205 determines whether reception in P2P burst communication performed by the communication main device is to be performed. In a case where the reception is to be performed (YES in step S312), the processing proceeds to step S313. In a case where the reception is not to be performed (NO in step S312), the processing proceeds to step S314.

In step S313, the camera microcomputer 205 performs the reception in P2P burst communication performed by the communication main device, and then, the processing proceeds to step S315. The details of processing of the reception in P2P burst communication performed by the communication main device will be described below.

In step S314, the camera microcomputer 205 determines whether the signal level of the signal line CS is Lo. In a case where the signal level is Lo (YES in step S314), the processing proceeds to step S315. In a case where the signal level is not Lo (NO in step S314), the processing in step S314 is repeated.

In step S315, the camera microcomputer 205 analyzes the data received from the signal line DATA.

In step S316, the camera microcomputer 205 determines whether the signal level of the signal line CS is Hi. In a case where the signal level is Hi (YES in step S316), the processing proceeds to step S317. In a case where the signal level is not Hi (NO in step S316), the processing in step S316 is repeated.

In step S317, the camera microcomputer 205 determines whether a broadcast communication event has occurred. In a case where the event has occurred (YES in step S317), the processing proceeds to step S318. In a case where the event has not occurred (NO in step S317), the processing ends.

In step S318, the camera microcomputer 205 shifts communication to broadcast communication from P2P communication.

Next, a processing flow of the adapter microcomputer 302 serving as a communication sub device will be described. Since a processing flow of the lens microcomputer 111 serving as a communication sub device is similar to the processing flow of the adapter microcomputer 302, the description will be omitted. In step S400, the adapter microcomputer 302 permits data reception from the signal line DATA as P2P communication.

In step S401, the adapter microcomputer 302 determines whether reception in P2P burst communication performed by the communication sub device is to be performed. In a case where the reception is to be performed (YES in step S401), the processing proceeds to step S402. In a case where the reception is not to be performed (NO in step S401), the processing proceeds to step S403.

In step S402, the adapter microcomputer 302 performs the reception in P2P burst communication performed by the communication sub device, and then, the processing proceeds to step S404. The details of processing of the reception in P2P burst communication performed by the communication sub device will be described below.

In step S403, the adapter microcomputer 302 determines whether the signal level of the signal line CS is Lo. In a case where the signal level is Lo (YES in step S403), the processing proceeds to step S404. In a case where the signal level is not Lo (NO in step S403), the processing in step S403 is repeated.

In step S404, the adapter microcomputer 302 permits data reception from the signal line DATA as broadcast communication.

In step S405, the adapter microcomputer 302 analyzes the data received from the signal line DATA.

In step S406, the adapter microcomputer 302 determines whether the signal level of the signal line CS is Hi. In a case where the signal level is Hi (YES in step S406), the processing proceeds to step S408. In a case where the signal level is not Hi (NO in step S406), the processing proceeds to step S407.

In step S407, the adapter microcomputer 302 determines whether the reception of a start bit from the signal line DATA has been detected. In a case where the reception of a start bit has been detected (YES in step S407), the processing proceeds to step S420. In a case where the reception of a start bit has not been detected (NO in step S407), the processing returns to step S406.

In step S408, the adapter microcomputer 302 determines whether the data received in step S405 includes a transmission request command. In a case where the transmission request command is included (YES in step S408), the processing proceeds to step S409. In a case where the transmission request command is not included (NO in step S408), the processing proceeds to step S414.

In step S409, the adapter microcomputer 302 operates the input-output changeover switch 3032 and connects the signal line DATA to the data output unit of the adapter microcomputer 302.

In step S410, the adapter microcomputer 302 determines whether transmission in P2P burst communication performed by the communication sub device is to be performed. In a case where the transmission is to be performed (YES in step S410), the processing proceeds to step S411. In a case where the transmission is not to be performed (NO in step S410), the processing proceeds to step S412.

In step S411, the adapter microcomputer 302 performs the transmission in P2P burst communication performed by the communication sub device, and then, the processing proceeds to step S413. The details of processing of the transmission in P2P burst communication performed by the communication sub device will be described below.

In step S412, the adapter microcomputer 302 starts data transmission.

In step S413, the adapter microcomputer 302 operates the input-output changeover switch 3032 and connects the signal line DATA to the data input unit of the adapter microcomputer 302.

In step S414, the adapter microcomputer 302 turns on (connects) the ground switch 3031 and starts the Lo output to the signal line CS.

In step S415, the adapter microcomputer 302 permits data reception from the signal line DATA as broadcast communication.

In step S416, the adapter microcomputer 302 turns off (blocks) the ground switch 3031 and cancels the Lo output to the signal line CS.

In step S417, the adapter microcomputer 302 determines whether the signal level of the signal line CS is Hi. In a case where the signal level is Hi (YES in step S417), the processing proceeds to step S419. In a case where the signal level is not Hi (NO in step S417), the processing proceeds to step S418.

In step S418, the adapter microcomputer 302 determines whether the reception of a start bit from the signal line DATA has been detected. In a case where the reception of a start bit has been detected (YES in step S418), the processing proceeds to step S420. In a case where the reception of a start bit has not been detected (NO in step S418), the processing returns to step S417.

In step S419, the adapter microcomputer 302 executes processing that is based on the received data analyzed in step S405. By restarting the processing after executing the processing in step S419, P2P communication can be continued.

In step S420, the adapter microcomputer 302 interrupts the processing of P2P communication. Thereafter, the processing proceeds to step S205 in FIG. 8 to perform broadcast communication.

As described above, a communication partner in P2P communication can be designated by broadcast communication, and switching between broadcast communication and P2P communication can be performed.

Here, a size of data that can be transmitted in one P2P communication is restricted by a reception buffer size on a reception side, and therefore the data size is insufficient.

Although data having a sufficient data size can be transferred by repeating normal P2P communication, a communication main device and a communication sub device alternately perform data transmission and a standby request via the signal line CS in normal P2P communication, and thereby an excessive transmission time is required. To solve the issue, P2P burst communication described next is useful.

<P2P Burst Communication Method (Third Communication Method)>

P2P burst communication to be performed between the camera microcomputer 205 and the adapter microcomputer 302 will be described with reference to FIGS. 11 to 13. FIG. 11 is a diagram exemplifying a signal waveform in P2P burst communication (communication sub device transmission). In FIG. 11, the adapter microcomputer 302 is designated by the camera microcomputer 205 in broadcast communication as a communication partner in P2P communication. Thereafter, normal P2P communication including transmission from the camera microcomputer 205 and a return from the adapter microcomputer 302 is executed. Yet thereafter, the camera microcomputer 205 transmits a command for shifting to a P2P burst communication method (third communication method). The communication method thereby shifts from the second communication method to the third communication method, and data transmission in P2P burst communication (communication sub device transmission) as one-way communication from the adapter microcomputer 302 to the camera microcomputer 205 is performed.

The processing of designating a communication partner in P2P communication, and normal P2P communication (P2P communication that does not use the P2P burst communication method) have already been described with reference to FIG. 6, and thus, the description will be omitted. In the normal P2P communication, information regarding a communication rule (also referred to as a communication, a protocol, a communication protocol or communication condition) used for P2P burst communication to be performed afterward is shared. In the P2P burst communication method (third communication method), data communication is performed in a data block unit having a specific data size. The data block unit can be a unit of a specific number or a variable number of data blocks. Thus, the communication rule information may include a block size, an inter-block wait time (waiting time), the number of blocks up to flow control, and a total size, although the communication rule information is not limited to these.

The block refers to a unit (group) for collectively or intensively communicating data using the P2P burst communication method, and the block size refers to the number of bytes of one block. In this example, the block size is set to 16 bytes as a size in which the camera microcomputer 205 on the reception side of P2P burst communication can consecutively receive data. The inter-block wait time is a time until the adapter microcomputer 302 on the transmission side of P2P burst communication starts transmission of next one block after completing the transmission of one block. The inter-block wait time is, in this example, a time until the camera microcomputer 205 on the reception side of P2P burst communication becomes able to receive next one block after completing the reception of one block, and is set to 100 μs.

Flow control in P2P burst communication can be implemented by the camera microcomputer 205 on the reception side of P2P burst communication issuing a notification of a communication timing using the signal line CS. For example, the camera microcomputer 205 needs to allocate resources to processing other than P2P burst communication, and therefore the camera microcomputer 205 avoids issuing a notification of a communication timing (issues communication standby request; performs standby processing of communication) until the processing is completed. By avoiding issuing the notification, a time for the processing other than communication can be ensured.

The number of blocks up to flow control is the number of blocks to be exchanged up to a flow control timing after P2P burst communication is started (or between one flow control and the following flow control). In this example, the number of blocks is the number of blocks that enable the camera microcomputer 205 on the reception side of P2P burst communication to complete processing other than P2P burst communication within the above-described standby time, and is set to four. The total size is a size of all pieces of data to be transmitted in P2P burst communication by the adapter microcomputer 302, which is on the transmission side of P2P burst communication.

The camera microcomputer 205 transmits a command for shifting to P2P burst communication (communication sub device transmission), to the adapter microcomputer 302. The adapter microcomputer 302 then performs P2P burst communication (communication sub device transmission) with the camera microcomputer 205 in accordance with the above-described communication rule information.

Specifically, the camera microcomputer 205 transmits a command for shifting to P2P burst communication (communication sub device transmission), to the adapter microcomputer 302 using the signal line DATA. The camera microcomputer 205 then notifies the adapter microcomputer 302 of a transmission end and a standby request for next data transmission using the signal line CS. When the adapter microcomputer 302 receives the command for shifting to P2P burst communication (communication sub device transmission), the adapter microcomputer 302 generates data to be transmitted in P2P burst communication (communication sub device transmission).

When the camera microcomputer 205 completes arrangements for reception in P2P burst communication, the camera microcomputer 205 cancels a standby request of communication (data transmission) issued by a request signal on the signal line CS. When the generation of data to be transmitted is completed, and a standby request issued from the camera microcomputer 205 by a request signal is canceled, the adapter microcomputer 302 transmits data corresponding to one block (block size of 16 bytes). After that, the adapter microcomputer 302 stops communication for an inter-block wait time (100 ρs) or more. When the camera microcomputer 205 receives the data corresponding to one block, the camera microcomputer 205 performs processing for receiving next data corresponding to one block, within the inter-block wait time.

After a start of P2P burst communication or execution of flow control, the camera microcomputer 205 and the adapter microcomputer 302 perform the above-described communication processing corresponding to one block, four times (corresponding to four blocks as "the number of blocks up to flow control"). When data transmission corresponding to the number of blocks up to flow control is completed, the adapter microcomputer 302 waits for flow control from the camera microcomputer 205. When data reception corresponding to the number of blocks up to flow control is completed, the camera microcomputer 205 outputs a standby request signal on the signal line CS for notifying interruption of reception and a standby request of data transmission. When arrangements for data reception in P2P burst communication are completed, the camera microcomputer 205 cancels the standby request signal on the signal line CS, and completes the flow control.

The camera microcomputer 205 and the adapter microcomputer 302 perform communication processing until data transfer corresponding to the total size is completed, while interposing the flow control. When the reception corresponding to the total size is completed, the camera microcomputer 205 waits for a standby request signal on the signal line CS to be issued by the adapter microcomputer 302 for notifying a transmission end and a standby request for data transmission. When data transfer corresponding to the total size is completed, the adapter microcomputer 302 outputs a standby request signal for notifying a transmission end and a standby request for data transmission, on the signal line CS, and then cancels the standby request signal. The P2P burst communication (communication sub device transmission) is thereby completed.

<Processing Flow in P2P Burst Communication (Communication Sub Device Transmission)>

A processing flow in P2P burst communication (sub device transmission) will be described with reference to FIGS. 12 and 13. FIG. 12 is a diagram exemplifying a processing flow of a communication main device in P2P burst communication (communication sub device transmission). FIG. 13 is a diagram exemplifying a processing flow of a communication sub device in P2P burst communication (communication sub device transmission). First, a processing flow of the camera microcomputer 205 serving as a communication main device will be described with reference to FIG. 12.

In step S500, the camera microcomputer 205 performs receiving processing of data, and the processing proceeds to step S501.

In step S501, the camera microcomputer 205 determines whether data reception corresponding to the total size has been completed. In a case where the data reception has been completed (YES in step S501), the processing proceeds to step S511. In a case where the data reception has not been completed (NO in step S501), the processing proceeds to step S502.

In step S502, the camera microcomputer 205 determines whether the signal level of the signal line CS is Lo. In a case where the signal level is Lo (YES in step S502), the processing ends. In a case where the signal level is not Lo (NO in step S502), the processing proceeds to step S503.

In step S503, the camera microcomputer 205 determines whether data reception corresponding to the block size has been completed. In a case where the data reception has been completed (YES in step S503), the processing proceeds to step S504. In a case where the data reception has not been completed (NO in step S503), the processing returns to step S500.

In step S504, the camera microcomputer 205 determines whether data reception corresponding to the number of blocks up to flow control has been completed. In a case where the data reception has been completed (YES in step S504), the processing proceeds to step S507. In a case where the data reception has not been completed (NO in step S504), the processing proceeds to step S505.

In step S505, the camera microcomputer 205 determines whether processing other than communication is required to be performed. In a case where the processing is required to be performed (YES in step S505), the processing proceeds to step S507. In a case where the processing is not required to be performed (NO in step S505), the processing proceeds to step S506.

In step S506, the camera microcomputer 205 executes processing of received data in P2P burst communication. Thereafter, the processing returns to step S500. The received data processing is processing of saving received data and enabling data of a next block to be received. The processing needs to be certainly completed within the above-described inter-block wait time.

In step S507, the camera microcomputer 205 turns on (connects) the ground switch 2081 and starts the Lo output to the signal line CS.

In step S508, the camera microcomputer 205 executes received data processing similar to the processing in step S506.

In step S509, the camera microcomputer 205 executes processing other than communication.

In step S510, the camera microcomputer 205 turns off (blocks) the ground switch 2081 and cancels the Lo output to the signal line CS.

In step S511, the camera microcomputer 205 determines whether the signal level of the signal line CS is Lo. In a case where the signal level is Lo (YES in step S511), the processing ends. In a case where the signal level is not Lo (NO in step S511), the processing in step S511 is repeated.

A processing flow of the adapter microcomputer 302 serving as a communication sub device will be described with reference to FIG. 13. A processing flow of the lens microcomputer 111 serving as a communication sub device is similar to the processing to be performed by the adapter microcomputer 302, and thus, the description will be omitted.

In step S600, the adapter microcomputer 302 starts data transmission.

In step S601, the adapter microcomputer 302 determines whether data transmission corresponding to the total size has been completed. In a case where the data transmission has been completed (YES in step S601), the processing ends. In a case where the data transmission has not been completed (NO in step S601), the processing proceeds to step S602.

In step S602, the adapter microcomputer 302 determines whether data transmission corresponding to the block size has been completed. In a case where the data transmission has been completed (YES in step S602), the processing proceeds to step S603. In a case where the data transmission has not been completed (NO in step S602), the processing returns to step S600.

In step S603, the adapter microcomputer 302 determines whether data transmission corresponding to the number of blocks up to flow control has been completed. In a case where the data transmission has been completed (YES in step S603), the processing proceeds to step S607. In a case where the data transmission has not been completed (NO in step S603), the processing proceeds to step S604.

In step S604, the adapter microcomputer 302 determines whether the signal level of the signal line CS is Lo. In a case where the signal level is Lo (YES in step S604), the processing proceeds to step S606. In a case where the signal level is not Lo (NO in step S604), the processing proceeds to step S605.

In step S605, the adapter microcomputer 302 determines whether an inter-block wait time has elapsed. In a case where the inter-block wait time has elapsed (YES in step S605), the processing returns to step S600. In a case where the inter-block wait time has not elapsed (NO in step S605), the processing returns to step S604.

In step S606, the adapter microcomputer 302 operates the input-output changeover switch 3032 and connects the signal line DATA to the data input unit of the adapter microcomputer 302. The processing then proceeds to step S609.

In step S607, the adapter microcomputer 302 operates the input-output changeover switch 3032 and connects the signal line DATA to the data input unit of the adapter microcomputer 302.

In step S608, the adapter microcomputer 302 determines whether the signal level of the signal line CS is Lo. In a case where the signal level is Lo (YES in step S608), the processing proceeds to step S609. In a case where the signal level is not Lo (NO in step S608), the processing in step S608 is repeated.

In step S609, the adapter microcomputer 302 permits data reception from the signal line DATA in broadcast communication.

In step S610, the adapter microcomputer 302 determines whether the signal level of the signal line CS is Hi. In a case where the signal level is Hi (YES in step S610), the processing proceeds to step S612. In a case where the signal level is not Hi (NO in step S610), the processing proceeds to step S611.

In step S611, the adapter microcomputer 302 determines whether the reception of a start bit from the signal line DATA has been detected. In a case where the reception of a start bit has been detected (YES in step S611), the processing proceeds to step S613. In a case where the reception of a start bit has not been detected (NO in step S611), the processing returns to step S610.

In step S612, the adapter microcomputer 302 operates the input-output changeover switch 3032 and connects the signal line DATA to the data output unit of the adapter microcomputer 302.

In step S613, the adapter microcomputer 302 interrupts the processing of P2P communication. The processing then proceeds to step S205 of FIG. 8 for performing broadcast communication.

An operation to be performed by the lens microcomputer 111 while the camera microcomputer 205 and the adapter microcomputer 302 are performing P2P burst communication with each other will be described with reference to FIG. 8. If the adapter microcomputer 302 is designated as a communication partner of P2P communication in broadcast communication performed by the camera microcomputer 205, the lens microcomputer 111 determines, in step S216, that the lens microcomputer 111 is not designated as a communication sub device. Thus, the lens microcomputer 111 does not shift to the P2P communication method. Thus, in subsequent normal P2P communication and the following P2P burst communication, the signal level of the signal line DATA is not set to a level other than Hi while the signal level of the signal line CS is set to Lo. In step S202, it is thereby not determined that a start bit has been received, and the processing sequentially proceeds to steps S200, S201, S202, S203, and S204. In other words, the camera microcomputer 205 and the adapter microcomputer 302 can perform P2P burst communication even if a communication sub device, such as the lens microcomputer 111 that is not a communication partner of P2P burst communication, is connected. As described above, in a case where the adapter microcomputer 302 is designated as a communication partner in P2P communication, the processing of the lens microcomputer 111 does not include processing of determining whether to shift to P2P burst communication (processing similar to the processing in step S401). The camera microcomputer 205 and the adapter microcomputer 302 can therefore perform P2P burst communication without any problems, even in a case where a conventional interchangeable lens (lens microcomputer) supporting only broadcast communication and normal P2P communication is connected.

As described above, a signal to be carried on the signal line CS is switched between the broadcast communication method and the P2P communication method in the system that performs communication using two signal lines corresponding to the signal line CS and the signal line DATA, in the present exemplary embodiment. With this configuration, a plurality of communication methods to be used for communication between the camera microcomputer 205 and the lens microcomputer 111 or the adapter microcomputer 302 can be implemented without increasing the number of signal lines. P2P burst communication (communication sub device transmission) different from normal P2P communication can also be implemented without increasing the number of signal lines.

<Switching to P2P Burst Communication Method (Communication Main Device Transmission)>

Figure 14:
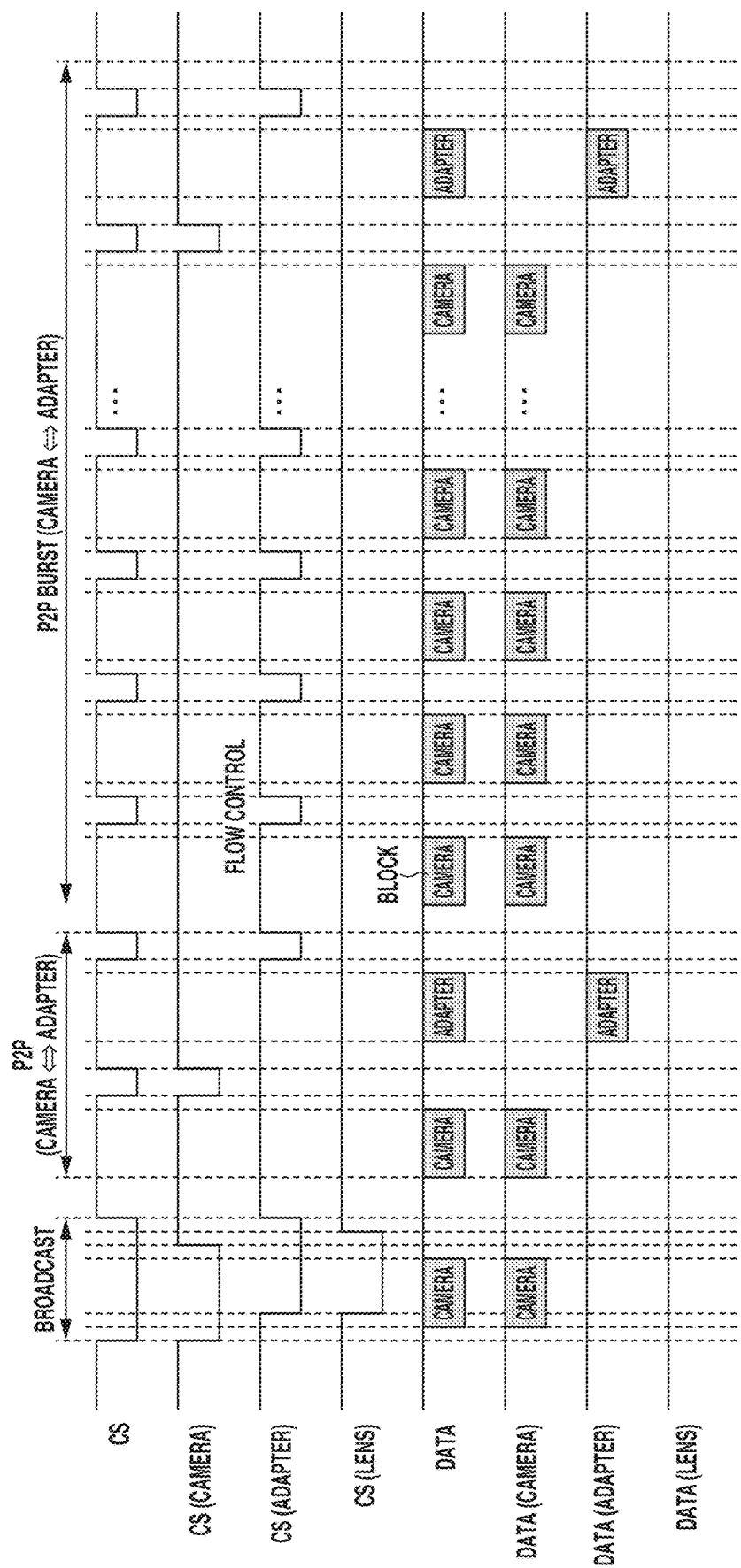
FIG. 14 is a diagram exemplifying a signal waveform in P2P burst communication (communication main device transmission).
Figure 15:
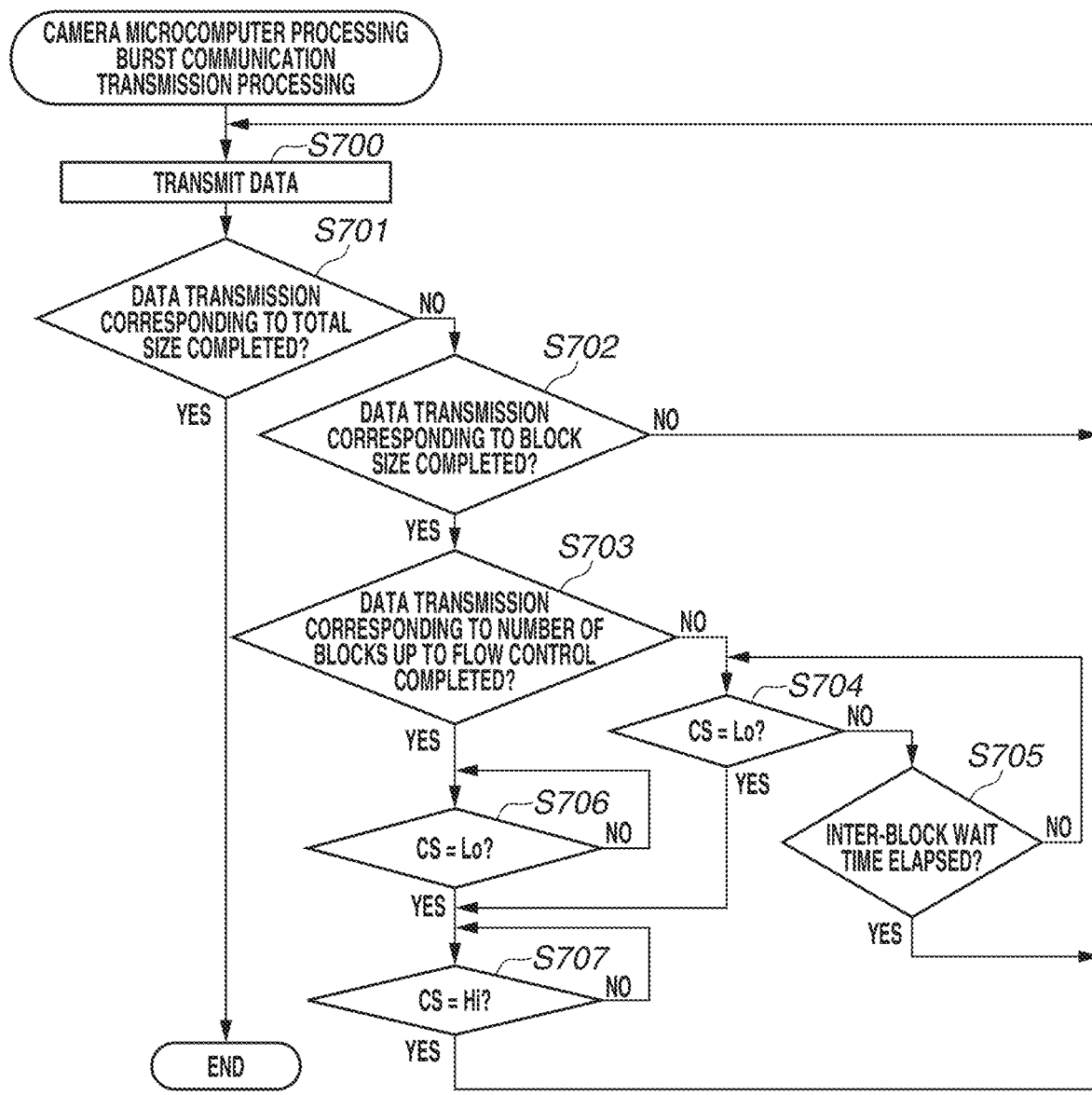
FIG. 15 is a diagram exemplifying a processing flow performed by a communication main device in P2P burst communication (communication main device transmission).
Figure 16:
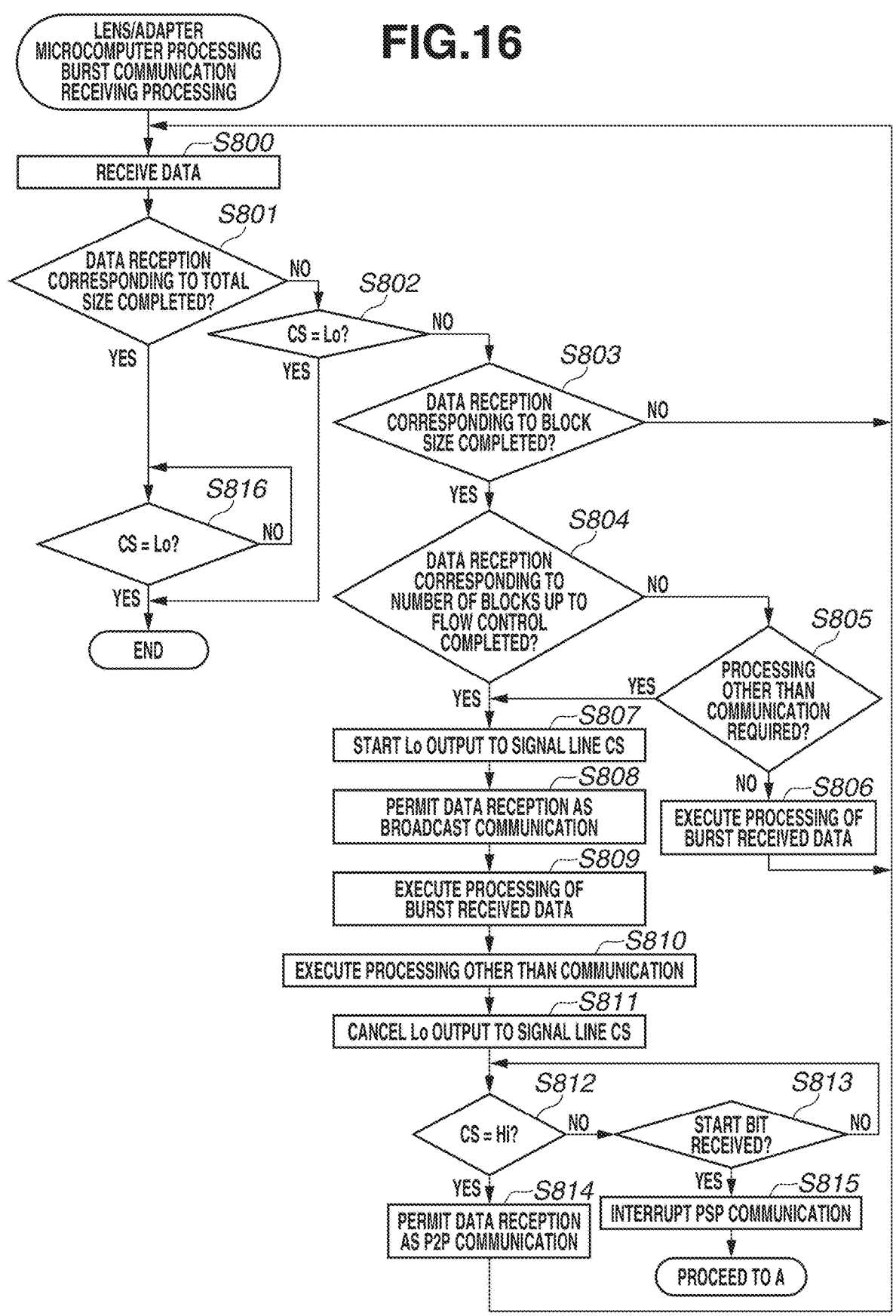
FIG. 16 is a diagram exemplifying a processing flow performed by a communication sub device in P2P burst communication (communication main device transmission).

Switching of P2P burst communication to be performed between the camera microcomputer 205 and the adapter microcomputer 302, and another example of P2P burst communication will be described with reference to FIGS. 14 to 16. FIG. 14 is a diagram exemplifying a signal waveform in P2P burst communication (communication main device transmission). FIG. 15 is a diagram exemplifying a processing flow of a communication main device in P2P burst communication (communication main device transmission). FIG. 16 is a diagram exemplifying a processing flow of a communication sub device in P2P burst communication (communication main device transmission).

FIG. 14 illustrates a signal waveform in P2P burst communication for performing data transmission from the camera microcomputer 205 serving as a communication main device to the adapter microcomputer 302 serving as a communication sub device. In this example, the adapter microcomputer 302 is designated, in broadcast communication performed by the camera microcomputer 205, as a communication partner in P2P communication, and then, normal P2P communication including transmission from the camera microcomputer 205 and a return from the adapter microcomputer 302 is executed. Thereafter, data transmission is performed from the camera microcomputer 205 by P2P burst communication (communication main device transmission), and a return regarding the data transmission is then performed from the adapter microcomputer 302 to the camera microcomputer 205.

Processing of designating a communication partner in P2P communication and normal P2P communication have already been described above with reference to FIG. 6, and therefore the description will be omitted. In the P2P communication, information regarding a communication rule used for P2P burst communication (communication main device transmission) to be performed afterward is shared. The type of the communication rule information can be the same as that in the above-described P2P burst communication (communication sub device transmission). In this example, the communication rule information includes a block size, an inter-block wait time, the number of blocks up to flow control, and a total size. In this example, the block size is set to eight bytes as a size in which the adapter microcomputer 302 on the reception side of P2P burst communication can consecutively receive data. In this example, the inter-block wait time is set to 150 µs. Since the number of blocks up to flow control is one in this example, flow control is always performed after one block transmission. Thus, the inter-block wait time is not used. The total size is a size of data to be transmitted by the camera microcomputer 205 to the adapter microcomputer 302 in P2P burst communication (communication main device transmission).

When the adapter microcomputer 302 performs a return in P2P communication for sharing rule information, the adapter microcomputer 302 makes arrangements for data reception in P2P burst communication (communication main device transmission). When the arrangements are completed, the adapter microcomputer 302 cancels a standby request signal for data transmission on the signal line CS. Based on the cancel of the standby request signal that is performed by the adapter microcomputer 302, the camera microcomputer 205 starts P2P burst communication (communication main device transmission), and transmits data corresponding to one block (block size of eight bytes). Since the number of blocks up to flow control is one, one block transmission is followed by flow control performed by the adapter microcomputer 302 without waiting for an inter-block wait time.

When data reception corresponding to the number of blocks up to flow control is completed, the adapter microcomputer 302 outputs, to the signal line CS, a standby request signal indicating a request of interruption of reception and data transmission standby. The adapter microcomputer 302 then cancels the standby request signal on the signal line CS when arrangements for data reception in P2P burst communication (communication main device transmission) are completed.

The camera microcomputer 205 and the adapter microcomputer 302 repeat the above-described processing up to flow control until data communication corresponding to the total size is completed. When data reception corresponding to the total size is completed, the adapter microcomputer 302 waits for a standby request signal indicating a transmission end and a request of data transmission standby that is output by the camera microcomputer 205 to the signal line CS. When data transmission corresponding to the total size is completed, the camera microcomputer 205 outputs the standby request signal to the signal line CS. Based on the cancel of the standby request signal that is performed by the camera microcomputer 205, the adapter microcomputer 302 performs data transmission regarding a reception result in P2P burst communication (communication main device transmission). The adapter microcomputer 302 then outputs a standby request signal indicating a transmission end and a request of data transmission standby, to the signal line CS, and cancels the standby request signal. The P2P burst communication (communication main device transmission) thereby ends.

<Processing Flow in P2P Burst Communication (Communication Main Device Transmission)>

A processing flow in P2P burst communication (communication main device transmission) will be described with reference to FIGS. 15 and 16. FIG. 15 is a diagram exemplifying a processing flow of a communication main device in P2P burst communication (communication main device transmission). FIG. 16 is a diagram exemplifying a processing flow of a communication sub device in P2P burst communication (communication main device transmission).

A processing flow of the camera microcomputer 205 serving as a communication main device will now be described with reference to FIG. 15. In step S700, the camera microcomputer 205 starts data transmission.

In step S701, the camera microcomputer 205 determines whether data transmission corresponding to the total size has been completed. In a case where the data transmission has been completed (YES in step S701), the processing ends. In a case where the data transmission has not been completed (NO in step S701), the processing proceeds to step S702.

In step S702, the camera microcomputer 205 determines whether data transmission corresponding to the block size has been completed. In a case where the data transmission has been completed (YES in step S702), the processing proceeds to step S703. In a case where the data transmission has not been completed (NO in step S702), the processing returns to step S700.

In step S703, the camera microcomputer 205 determines whether data transmission corresponding to the number of blocks up to flow control has been completed. In a case where the data transmission has been completed (YES in step S703), the processing proceeds to step S706. In a case where the data transmission has not been completed (NO in step S703), the processing proceeds to step S704.

In step S704, the camera microcomputer 205 determines whether the signal level of the signal line CS is Lo. In a case where the signal level is Lo (YES in step S704), the processing proceeds to step S707. In a case where the signal level is not Lo (NO in step S704), the processing proceeds to step S705.

In step S705, the camera microcomputer 205 determines whether an inter-block wait time has elapsed. In a case where the inter-block wait time has elapsed (YES in step S705), the processing returns to step S700. In a case where the inter-block wait time has not elapsed (NO in step S705), the processing returns to step S704.

In step S706, the camera microcomputer 205 determines whether the signal level of the signal line CS is Lo. In a case where the signal level is Lo (YES in step S706), the processing proceeds to step S707. In a case where the signal level is not Lo (NO in step S706), the processing in step S706 is repeated.

In step S707, the camera microcomputer 205 determines whether the signal level of the signal line CS is Hi. In a case where the signal level is Hi (YES in step S707), the processing returns to step S700. In a case where the signal level is not Hi (NO in step S707), the processing in step S707 is repeated.

A processing flow of the adapter microcomputer 302 serving as a communication sub device will be described with reference to FIG. 16. Since a processing flow of the lens microcomputer 111 is similar to the processing to be performed by the adapter microcomputer 302, the description will be omitted. In step S800, the adapter microcomputer 302 performs receiving processing of data.

In step S801, the adapter microcomputer 302 determines whether data reception corresponding to the total size has been completed. In a case where the data reception has been completed (YES in step S801), the processing proceeds to step S816. In a case where the data reception has not been completed (NO in step S801), the processing proceeds to step S802.

In step S802, the adapter microcomputer 302 determines whether the signal level of the signal line CS is Lo. In a case where the signal level is Lo (YES in step S802), the processing ends. In a case where the signal level is not Lo (NO in step S802), the processing proceeds to step S803.

In step S803, the adapter microcomputer 302 determines whether data reception corresponding to the block size has been completed. In a case where the data reception has been completed (YES in step S803), the processing proceeds to step S804. In a case where the data reception has not been completed (NO in step S803), the processing returns to step S800.

In step S804, the adapter microcomputer 302 determines whether data reception corresponding to the number of blocks up to flow control has been completed. In a case where the data reception has been completed (YES in step S804), the processing proceeds to step S807. In a case where the data reception has not been completed (NO in step S804), the processing proceeds to step S805.

In step S805, the adapter microcomputer 302 determines whether processing other than communication is required to be performed. In a case where processing other than communication is required to be performed (YES in step S805), the processing proceeds to step S807. In a case where processing other than communication is not required to be performed (NO in step S805), the processing proceeds to step S806.

In step S806, the adapter microcomputer 302 executes processing of received data. The processing then returns to step S800. The received data processing is processing for saving the received data and enabling data of a next block to be received. The processing needs to be completed within the above-described inter-block wait time.

In step S807, the adapter microcomputer 302 turns on (connects) the ground switch 2081 and starts the Lo output to the signal line CS.

In step S808, the adapter microcomputer 302 permits data reception from the signal line DATA in broadcast communication.

In step S809, the adapter microcomputer 302 executes received data processing similar to the processing in step S806.

In step S810, the adapter microcomputer 302 executes processing other than communication.

In step S811, the adapter microcomputer 302 turns off (blocks) the ground switch 2081 and cancels the Lo output to the signal line CS.

In step S812, the adapter microcomputer 302 determines whether the signal level of the signal line CS is Hi. In a case where the signal level is Hi (YES in step S812), the processing proceeds to step S814. In a case where the signal level is not Hi (NO in step S812), the processing proceeds to step S813.

In step S813, the adapter microcomputer 302 determines whether the reception of a start bit from the signal line DATA has been detected. In a case where the reception of a start bit has been detected (YES in step S813), the processing proceeds to step S815. In a case where the reception of a start bit has not been detected (NO in step S813), the processing proceeds to step S812.

In step S814, the adapter microcomputer 302 permits data reception from the signal line DATA in P2P communication.

In step S815, the adapter microcomputer 302 interrupts P2P communication. The processing then proceeds to step S205 of FIG. 8 for performing broadcast communication. An operation to be performed by the lens microcomputer 111 while the camera microcomputer 205 and the adapter microcomputer 302 are performing P2P burst communication (communication main device transmission) with each other is similar to that performed in the above-described P2P burst communication (communication sub device transmission). Thus, the description of the operation will be omitted.

According to the present exemplary embodiment, an accessory apparatus advantageous in efficient data communication can be provided, which will be described below. In P2P burst communication, as compared with normal P2P communication, data can be transmitted in a shorter time by cutting a part of processing related to communication. Specifically, processing related to data communication for issuing a data request is reduced in a receiving apparatus that receives data. In typical P2P communication, processing of data communication for issuing a data request has been required for each size (i.e., each block size) in which a receiving apparatus can consecutively receive data. In contrast, in P2P burst communication, processing of data communication for issuing a data request is required only at a timing at which P2P burst communication is started.

In addition, processing of notifying a data communication timing via the signal line CS from a transmission apparatus that transmits data is reduced. In typical P2P communication, the transmission apparatus has been required to perform processing of notifying a data communication timing via the signal line CS, for each block size. In contrast, in P2P burst communication, processing performed by the transmission apparatus of notifying a data communication timing via the signal line CS is required only at a timing at which P2P burst communication is ended.

Furthermore, processing of notifying a data communication timing via the signal line CS from a receiving apparatus that receives data is reduced. In typical P2P communication, the receiving apparatus has been required to perform processing of notifying a communication timing via the signal line CS, for each block size. In contrast, in P2P burst communication, processing performed by the receiving apparatus of notifying a communication timing via the signal line CS is not required between blocks not requiring flow control (transmission apparatus performs inter-block wait processing of stopping transmission for a period of an inter-block wait time). The inter-block wait time is a time required for the receiving apparatus becoming able to receive next one-block data. The time can be set to a time shorter than a time required for processing in which the receiving apparatus notifies a communication timing via the signal line CS in typical P2P communication. Thus, a communication time is reduced by replacing the notification processing with the inter-block wait processing.

As described above, in P2P burst communication, data can be transmitted in a shorter time (i.e., more efficiently) as compared with normal P2P communication.

A communication time required for transmitting 4096-byte data in the present exemplary embodiment when a communication rate is 1 Mbps will be exemplified below. First, a communication time in typical P2P communication will be described. As already described with reference to FIG. 3, a start bit ST, a parity bit PA, and a stop bit SP are added for transmitting one-byte information, 11-bit data transmission becomes necessary. In a case where a communication speed is 1 Mbps, a time of 11 μs is required to transmit 11-bit data. In typical P2P communication, as illustrated in FIG. 5, a data request issued by a receiving apparatus and a notification issued by the receiving apparatus via the signal line CS (standby request issued by a request signal; standby processing of communication), and data transmission performed by a transmission apparatus and a notification issued by the transmission apparatus via the signal line CS are repeated until transmission of all pieces of data is completed. In a case where the data request is issued using one-byte information, a time of 11 μs is required for the request. In the following notification issued via the signal line CS, a time of 100 μs is required from the data request to the timing when the level of the signal line CS is set to Lo, a time of 100 μs is required for maintaining the level at Lo, and a time of 100 μs is required from when the level is set to Hi until next data is received. In other words, a time of 300 μs in total is required at the shortest. Subsequently, a time of 176 μs is required at the shortest for the transmission apparatus to transmit 16-byte data. Thereafter, a notification issued by the transmission apparatus via the signal line CS requires a time of 300 μs at the shortest as described above. In view of the foregoing, in typical P2P communication, transmission of data with an information amount (communication information amount) of 16 bytes requires a time (time interval between two request signals) of 787 μs. Thus, a time of approximately 201 ms is necessary to transmit 4096-byte information at the shortest.

A communication time in P2P burst communication will be described. In P2P burst communication, a data request issued by the receiving apparatus and a notification issued by the receiving apparatus via the signal line CS, and transmission of data corresponding to four blocks that is performed by the transmission apparatus while interposing three inter-block wait times, and a notification issued by the receiving apparatus via the signal line CS are performed, as illustrated in FIG. 11. The data corresponding to four blocks has an information amount (communication information amount) of 64 bytes. The transmission of data corresponding to four blocks that is performed by the transmission apparatus and the notification issued by the receiving apparatus via the signal line CS are repeated until the transmission of all pieces of data is completed. The data request requires a communication time of 11 μs. The following notification issued via the signal line CS requires a time of 300 μs. Subsequently, to transmit, for the transmission apparatus, data corresponding to four blocks, a transmission time corresponding to four blocks and three inter-block wait times are required between one flow control (standby processing of communication) and the following flow control. In other words, a time of 176 μs×4+100 μs×3=1004 μs is required. The subsequent flow control requires the same time as the time required for a notification issued via the signal line CS. That is, a time of 300 μs is required at the shortest. Thus, a time of 1304 μs (time interval between two request signals) is required to transmit 64-byte between one flow control and the following flow control, and a time of about 84 ms is required at the shortest to transmit 4096-byte data. In view of the foregoing, P2P burst communication can perform data transmission within a time equal to or smaller than a half of a time required in typical P2P communication, in this example.

As described above, according to the present exemplary embodiment, for example, an accessory apparatus advantageous in efficient data communication can be provided. This is because the ratio of a standby time required by a standby request signal to a time required for communication performed between an accessory apparatus and an imaging apparatus is lower in the third communication method than the ratio in the second communication method. In addition, in the system that performs communication using two signal lines corresponding to the signal line CS and the signal line DATA, P2P burst communication can be implemented without adding a signal line. Here, efficient and normal data communication can be obtained by defining a reception buffer size in a receiving apparatus as a block size, and defining a time required by the receiving apparatus after transmission of data corresponding to one block for processing of the data, as an inter-block wait time. Furthermore, the number of blocks up to flow control is defined, and after the transmission of data corresponding to the number of blocks, flow control is performed for putting data transmission by the transmission apparatus (transmission side apparatus) on standby for a time required by the receiving apparatus (reception side apparatus). With this configuration, the receiving apparatus can concurrently perform processing other than communication. In P2P burst communication, unlike typical P2P communication, a device, which is out of a communication main device and a communication sub device, that performs transmission transmits data via the signal line DATA, and a device that performs reception transmits a signal for flow control via the signal line CS. Thus, P2P burst communication can shorten a communication time as compared the communication time used in typical P2P communication. In the flow control, a time for processing other than communication is ensured. A time for which the level of the signal line CS is maintained at Lo therefore becomes longer. It is thus desirable, from the perspective of efficiency of P2P burst communication, to increase the block size and the number of blocks up to flow control as large as possible, and decrease the number of times of flow control as small as possible.

In a case where flow control is performed without using an inter-block wait time as illustrated in FIG. 14, the number of blocks up to flow control is only required to be set to one. With this configuration, flow control can be performed each time the receiving apparatus receives data corresponding to a reception buffer size. With this configuration, even in a case where a time required for withdrawal processing of received data in the receiving apparatus varies, that is, even in a case where an inter-block wait time cannot be defined, P2P burst communication can be performed by flow control.

An inter-block wait time may be used without performing flow control. In this case, for example, the number of blocks up to flow control is only required to be made Go (in the communication rule, the number of blocks is only required to be set to 0 for the sake of convenience). In this case, it is always determined that data reception corresponding to the number of blocks up to flow control has not been completed, in conditional branching (determination) in step S504 of FIG. 12, step S603 of FIG. 13, step S703 of FIG. 15, and step S804 of FIG. 16.

Figure 12:
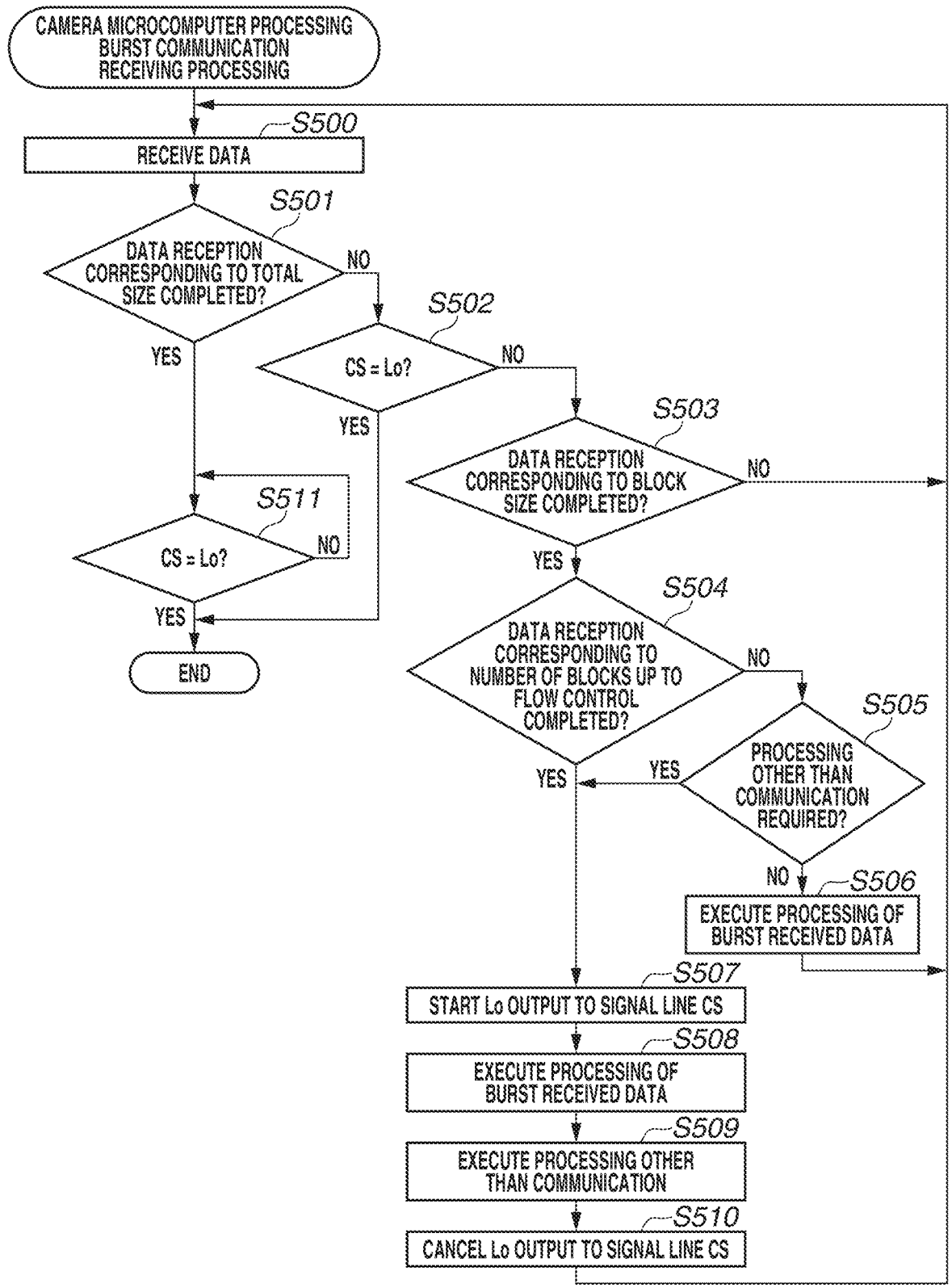
FIG. 12 is a diagram exemplifying a processing flow of a communication main device in P2P burst communication (communication sub device transmission).
Figure 13:
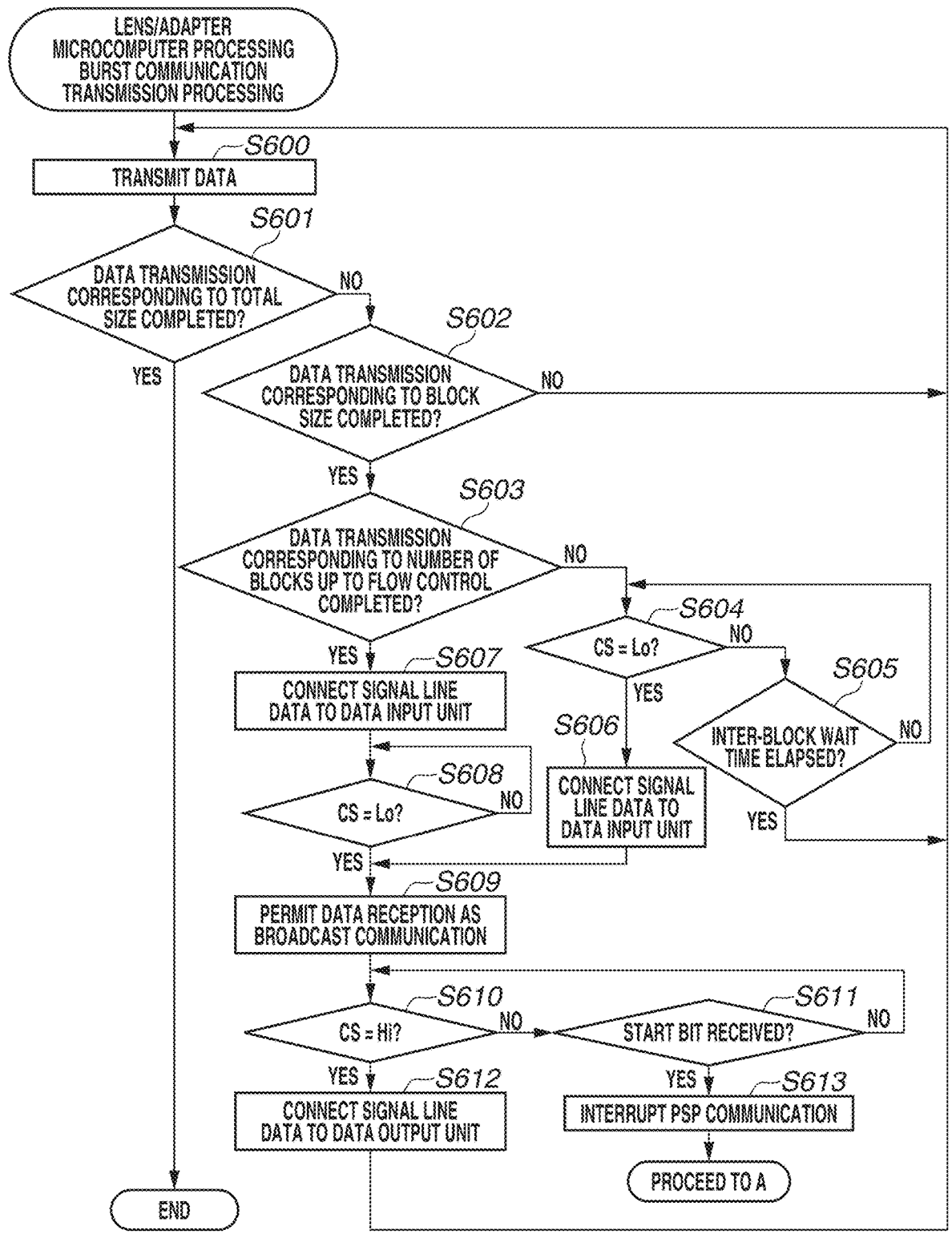
FIG. 13 is a diagram exemplifying a processing flow of a communication sub device in P2P burst communication (communication sub device transmission).

In step S505 of FIG. 12 or step S805 of FIG. 16, the signal level of the signal line CS is set to Lo, in a case where it becomes necessary to execute processing other than communication although processing related to an inter-block wait time is to be typically performed. In this case, in step S604 of FIG. 13 or step S704 of FIG. 15, the transmission apparatus shifts to processing related to flow control, in a case where the Lo signal level of the signal line CS is detected although the transmission apparatus is typically to be put on standby for an inter-block wait time. With this configuration, a time for the processing other than communication can be ensured, in a case where it becomes necessary to execute processing other than communication at a timing of processing related to an inter-block wait time.

In the present exemplary embodiment, a communication sub device can perform reception in broadcast communication while receiving a control signal (standby request signal) indicating a standby request after data transmission (while the signal level of the signal line CS is set to the Lo level) in the P2P communication method. Specifically, the communication sub device permits data reception from the signal line DATA in broadcast communication, in steps S404 and S415 of FIGS. 10A and 10B, step S609 of FIG. 13, and step S808 of FIG. 16. It is then determined whether data is received while data reception is permitted, in steps S407 and S418 of FIGS. 10A and 10B, step S611 of FIG. 13, and step S813 of FIG. 16. In a case where data is received, P2P communication is interrupted in step S420 of FIG. 10B, step S613 of FIG. 13, and step S815 of FIG. 16, and a communication method can be shifted to the broadcast communication method. In this manner, in a case where the camera microcomputer 205 detects (recognizes) an abnormality in communication with the adapter microcomputer 302 or the lens microcomputer 111, the camera microcomputer 205 can shift to broadcast communication even if communication is being performed in P2P burst communication. Thereafter, the camera microcomputer 205 can redo P2P burst communication via the broadcast communication.

Figure 17:
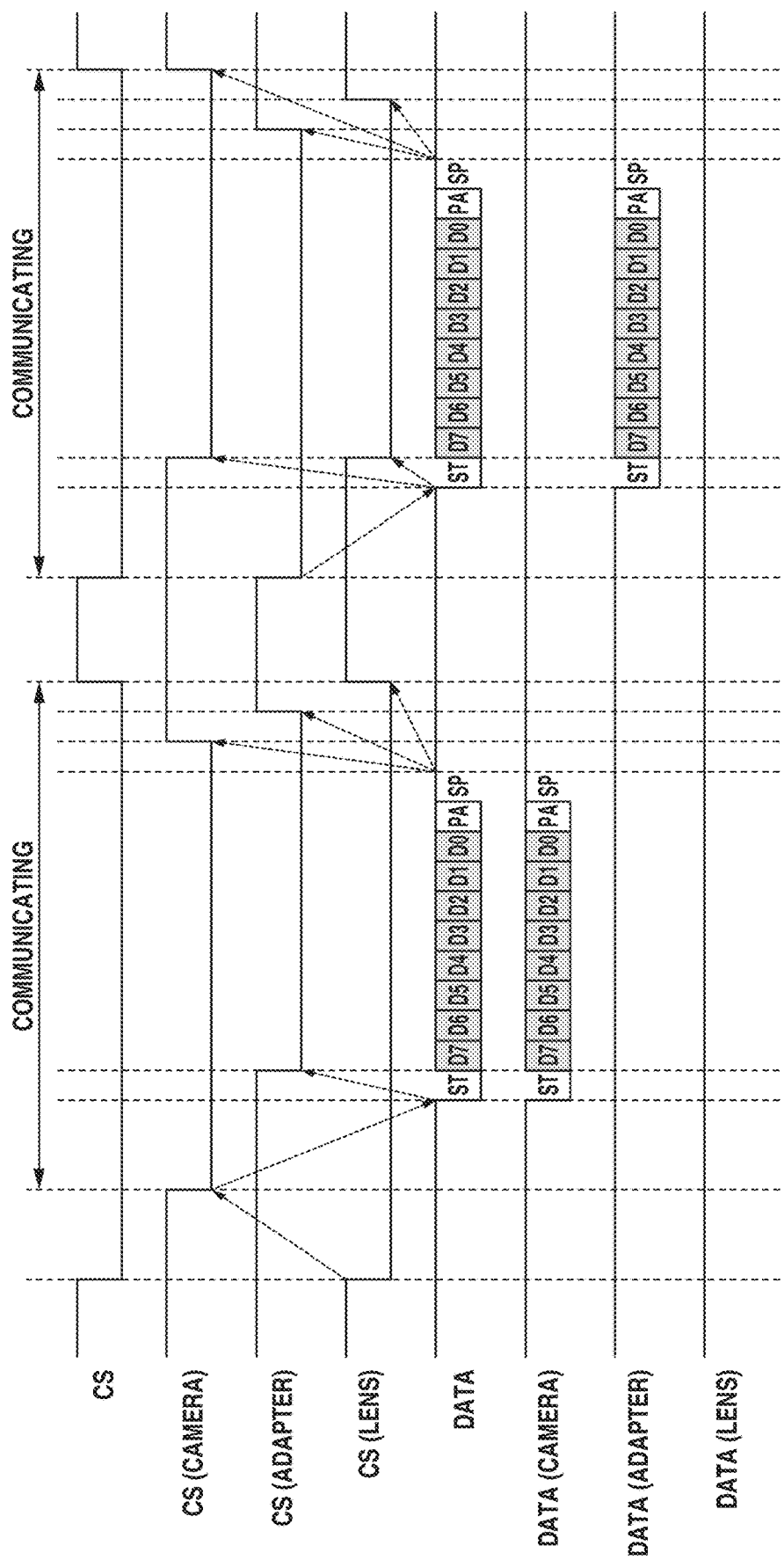
FIG. 17 is a diagram exemplifying a signal waveform in broadcast communication.

A case will be described where broadcast communication is started from the lens microcomputer 111 or the adapter microcomputer 302 serving as a communication sub device with reference to FIG. 17. FIG. 17 is a diagram exemplifying a signal waveform in broadcast communication. Starting broadcast communication from a communication sub device will be referred to as a communication request. In a state where communication from the camera microcomputer 205 serving as a communication main device to a communication sub device is suspended, the communication sub device can voluntarily restart broadcast communication by issuing a communication request to the camera microcomputer 205. As an example, the description will be given of a case where a start of broadcast communication is notified from the lens microcomputer 111, and then, the adapter microcomputer 302 performs broadcast communication in response to broadcast communication from the camera microcomputer 205.

The lens microcomputer 111 starts the Lo output to the signal line CS to notify the camera microcomputer 205 and the adapter microcomputer 302 of a start of broadcast communication. When the camera microcomputer 205 detects that the signal level of the signal line CS is set to the Lo level, the camera microcomputer 205 starts the Lo output to the signal line CS. At this time point, the lens microcomputer 111 has already started the Lo output to the signal line CS and thus, the signal level of the signal line CS does not change.

The camera microcomputer 205 then outputs data to be transmitted to the signal line DATA. In contrast, the adapter microcomputer 302 starts the Lo output to the signal line CS at a timing at which the start bit ST input from the signal line DATA is detected. At this time point, the lens microcomputer 111 or the camera microcomputer 205 has already started the Lo output to the signal line CS, and thus, the signal level of the signal line CS does not change.

After the camera microcomputer 205 ends the transmission of data up to the stop bit SP, the camera microcomputer 205 cancels the Lo output to the signal line CS. In contrast, the lens microcomputer 111 and the adapter microcomputer 302 perform analysis of the received data and internal processing associated with the received data, after the lens microcomputer 111 and the adapter microcomputer 302 complete the reception of data up to the stop bit SP that has been input from the signal line DATA. Thereafter, the lens microcomputer 111 and the adapter microcomputer 302 make arrangements for data reception, and then cancel the Lo output to the signal line CS. As described above, the signal level of the signal line CS is set to Hi by all of the camera microcomputer 205, the lens microcomputer 111, and the adapter microcomputer 302 cancelling the Lo output to the signal line CS. It can thus be determined that all microcomputers have ended processing related to current communication, and have made arrangements for performing next communication, by confirming that the signal level of the signal line CS is set to Hi.

After the adapter microcomputer 302 confirms that the signal level of the signal line CS has been set to Hi, the adapter microcomputer 302 starts the Lo output to the signal line CS to notify the camera microcomputer 205 and the lens microcomputer 111 that broadcast communication is to be started. The adapter microcomputer 302 then outputs data to be transmitted to the signal line DATA. In contrast, in a case where the camera microcomputer 205 and the lens microcomputer 111 detect the start bit ST input from the signal line DATA, the camera microcomputer 205 and the lens microcomputer 111 start the Lo output to the signal line CS. At this time point, the adapter microcomputer 302 has already started the Lo output to the signal line CS, and thus, the signal level of the signal line CS does not change.

After the adapter microcomputer 302 ends the output of data up to the stop bit SP, the adapter microcomputer 302 cancels the Lo output to the signal line CS. In contrast, the camera microcomputer 205 and the lens microcomputer 111 perform analysis of the received data and internal processing associated with the received data, after the camera microcomputer 205 and the lens microcomputer 111 complete the reception of data up to the stop bit SP that has been input from the signal line DATA. The camera microcomputer 205 and the lens microcomputer 111 then make arrangements for data reception, and cancel the Lo output to the signal line CS.

Communication using the broadcast communication method is started from the lens microcomputer 111 or the adapter microcomputer 302 serving as a communication sub device, only when all of the camera microcomputer 205, the lens microcomputer 111, and the adapter microcomputer 302 support the broadcast communication method. In a case where broadcast communication is started from a communication sub device, the camera microcomputer 205 serving as a communication main device cannot identify which of the lens microcomputer 111 and the adapter microcomputer 302 has set the signal level of the signal line CS to Lo. The camera microcomputer 205 thus needs to perform communication for acquiring information indicating which of the lens microcomputer 111 and the adapter microcomputer 302 has started broadcast communication. In some cases, a timing at which the camera microcomputer 205 performs the Lo output to the signal line CS to start broadcast communication, and a timing at which a communication sub device performs the Lo output to the signal line CS to start broadcast communication become the same. In this case, the camera microcomputer 205 cannot detect that the communication sub device has performed the Lo output to the signal line CS, and therefore a notification for permitting a communication sub device to start broadcast communication may be issued from the camera microcomputer 205 to the communication sub device. As described above, broadcast communication can be started by a communication sub device in the system that performs communication using two signal lines corresponding to the signal line CS and the signal line DATA, according to the present exemplary embodiment. With this configuration, it is not necessary for the camera microcomputer 205 to continue to communicate with the lens microcomputer 111 and the adapter microcomputer 302 frequently, and thus, unnecessary communication can be reduced.

The communication rule information regarding P2P burst communication in the present exemplary embodiment includes a block size, an inter-block wait time, the number of blocks up to flow control, and a total size. However, the communication rule information is not limited to these. For example, in a case of performing flow control via the signal line CS without using an inter-block wait time, an inter-block wait time and the number of blocks up to flow control become unnecessary as communication rule information. In a similar manner, in the case of using an inter-block wait time without performing the flow control, the number of blocks up to flow control becomes unnecessary as communication rule information. These pieces of communication rule information need not be shared, and it is sufficient that information corresponding to the communication rule information is shared. For example, the number of blocks up to flow control may also be the number of bytes up to flow control, and the number of blocks up to flow control can be obtained from the number of bytes and the block size. In a similar manner, the total size may be the total number of blocks, and the total size can be obtained from the total number of blocks and the block size. The communication rule information may be obtained based on information, such as an ID related to a communication rule and a communication generation.

The communication rule information may include information different from the above-described information. For example, the communication rule information may include information, such as a communication rate or the presence or absence of parity. The communication rule information may include, as information for identifying data to be transmitted by P2P burst communication, information such as an ID of the interchangeable lens apparatus 100 or the camera main body 200, or a command associated with data to be acquired. The communication rule information may also include information (e.g., checksum, cyclic redundancy checksum (CRC), and hash value) for checking reliability of data transmitted by P2P burst communication.

The communication rule information is shared between a transmission apparatus and a receiving apparatus by typical P2P communication before P2P burst communication is performed. However, the configuration is not limited to this. For example, the communication rule information may be predetermined, may be shared between a transmission apparatus and a receiving apparatus using broadcast communication, or may be shared between a transmission apparatus and a receiving apparatus via another signal line or wirelessly.

Figure 18:
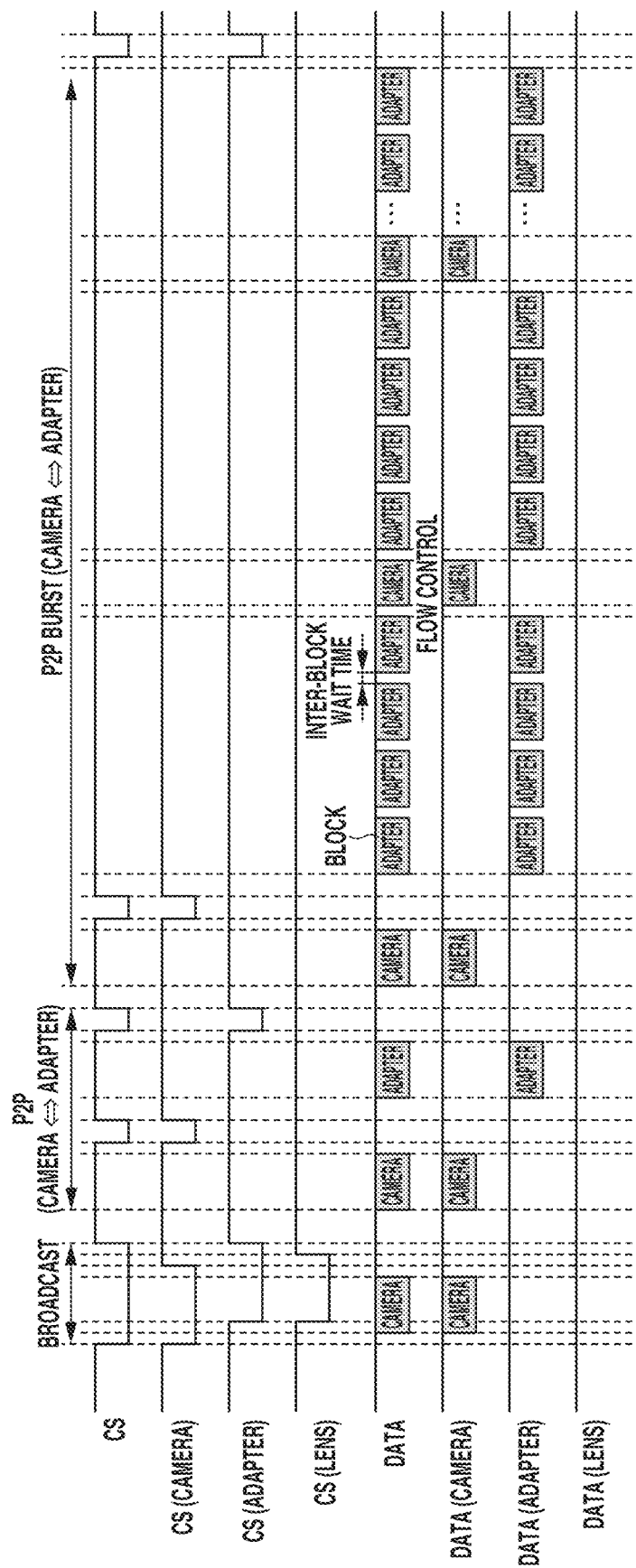
FIG. 18 is a diagram exemplifying a signal waveform in P2P burst communication (communication sub device transmission).

A second exemplary embodiment will be described with reference to the attached drawings. The second exemplary embodiment is different from the first exemplary embodiment in that flow control is performed using the signal line DATA instead of the signal line CS. FIG. 18 is a diagram exemplifying a communication waveform in P2P burst communication (communication sub device transmission). For flow control, the camera microcomputer 205 outputs data corresponding to specific two bytes, to the signal line DATA. First-byte data corresponds to a falling edge of the signal level of the signal line CS in the first exemplary embodiment, and second-byte data corresponds to a rising edge of the signal level of the signal line CS in the first exemplary embodiment.

Figure 19:
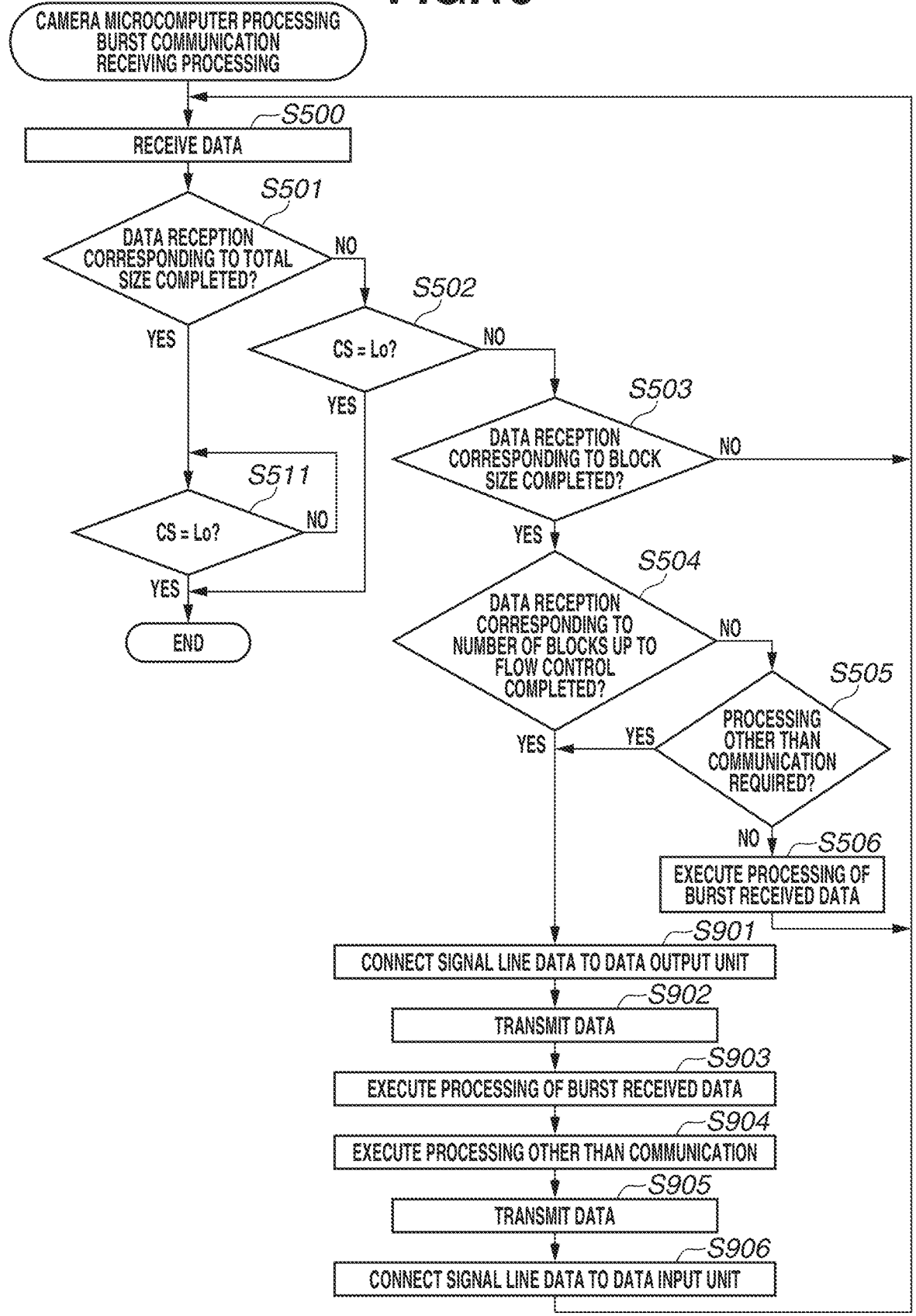
FIG. 19 is a diagram exemplifying a processing flow performed by a communication main device in P2P burst communication (communication sub device transmission).

The details of data reception in P2P burst communication (communication sub device transmission) to be performed by the camera microcomputer 205 will be described with reference to FIG. 19. FIG. 19 is a diagram exemplifying a processing flow of a communication main device in P2P burst communication (communication sub device transmission). The description of step numbers (processes) similar to those according to the first exemplary embodiment in FIG. 12 will be omitted.

In step S901, the camera microcomputer 205 operates the input-output changeover switch 2082 and connects the signal line DATA to the data output unit of the camera microcomputer 205.

In step S902, the camera microcomputer 205 outputs (transmits) the first-byte data.

In step S903, the camera microcomputer 205 executes received data processing similar to the processing performed in step S506 of FIG. 12.

In step S904, the camera microcomputer 205 executes processing other than communication that is similar to the processing in step S509 of FIG. 12.

In step S905, the camera microcomputer 205 outputs (transmits) the second-byte data.

In step S906, the camera microcomputer 205 operates the input-output changeover switch 2082 and connects the signal line DATA to the data input unit of the camera microcomputer 205.

Figure 20:
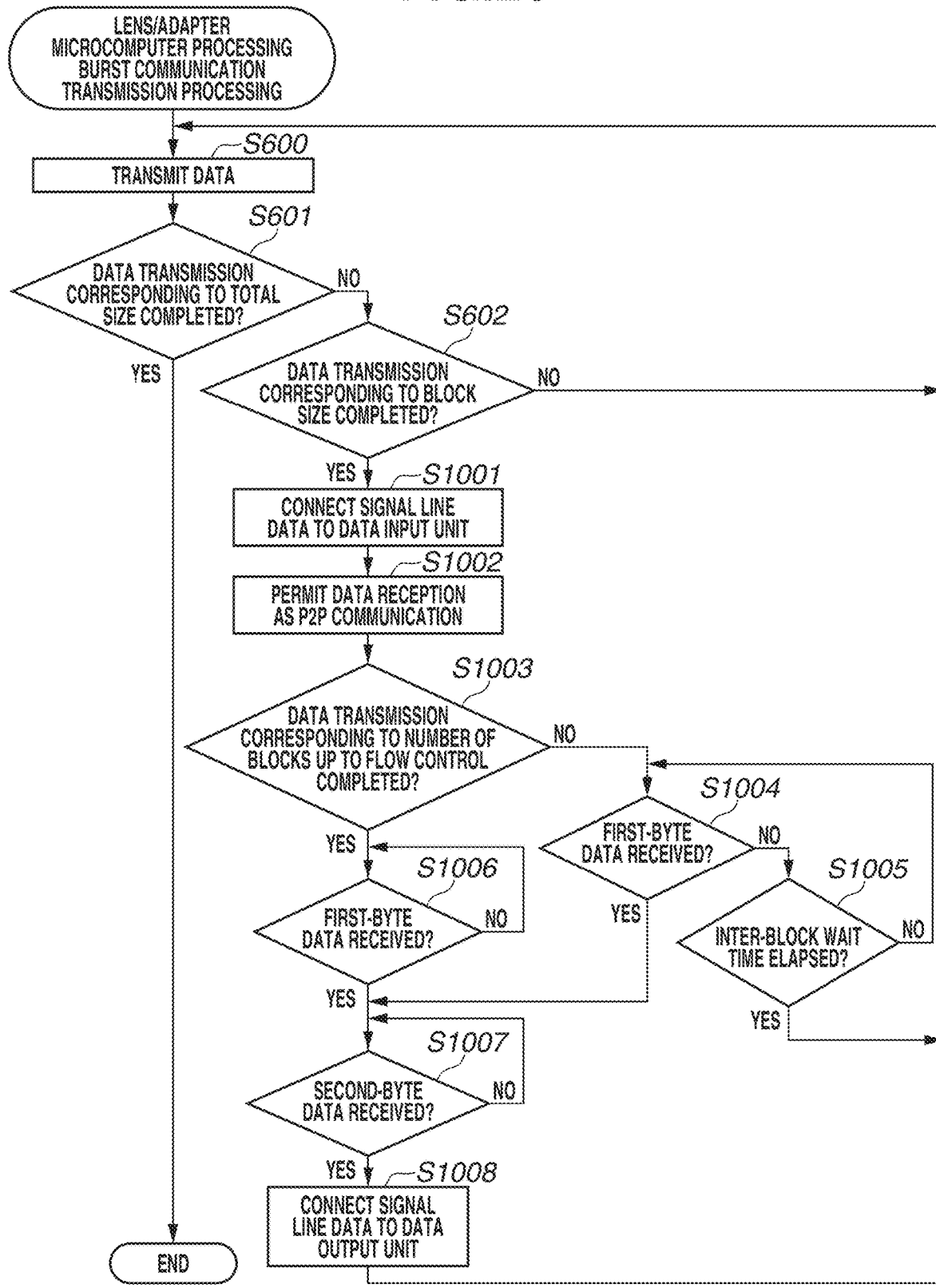
FIG. 20 is a diagram exemplifying a processing flow performed by a communication sub device in P2P burst communication (communication sub device transmission).

Subsequently, the details of transmission processing to be performed by the adapter microcomputer 302 in P2P burst communication (communication sub device transmission) will be described with reference to FIG. 20. FIG. 20 is a diagram exemplifying a processing flow of a communication sub device in P2P burst communication (communication sub device transmission). The description of step numbers (processes) similar to those according to the first exemplary embodiment in FIG. 13 will be omitted.

In step S1001, the adapter microcomputer 302 operates the input-output changeover switch 3032 and connects the signal line DATA to the data input unit of the adapter microcomputer 302.

In step S1002, the adapter microcomputer 302 permits data reception in P2P communication via the signal line DATA.

In step S1003, the adapter microcomputer 302 determines whether data transmission corresponding to the number of blocks up to flow control has been completed. In a case where the data transmission has been completed (YES in step S1003), the processing proceeds to step S1006. In a case where the data transmission has not been completed (NO in step S1003), the processing proceeds to step S1004.

In step S1004, the adapter microcomputer 302 determines whether the first-byte data has been received. In a case where the data has been received (YES in step S1004), the processing proceeds to step S1007. In a case where the data has not been received (NO in step S1004), the processing proceeds to step S1005.

In step S1005, the adapter microcomputer 302 determines whether an inter-block wait time has elapsed. In a case where the inter-block wait time has elapsed (YES in step S1005), the processing returns to step S800. In a case where the inter-block wait time has not elapsed (NO in step S1005), the processing returns to step S1004.

In step S1006, similar to step S1004, the adapter microcomputer 302 determines whether the first-byte data has been received. In a case where the first-byte data has been received (YES in step S1006), the processing proceeds to step S1007. In a case where the first-byte data has not been received (NO in step S1006), the processing in step S1006 is repeated.

In step S1007, the adapter microcomputer 302 determines whether the second-byte data has been received. In a case where the data has been received (YES in step S1007), the processing proceeds to step S1008. In a case where the data has not been received (NO in step S1007), the processing in step S1007 is repeated.

In step S1008, the adapter microcomputer 302 operates the input-output changeover switch 3032 and connects the signal line DATA to the data output unit of the adapter microcomputer 302.

As described above, flow control can be performed using the signal line DATA in P2P burst communication (communication sub device transmission), in the present exemplary embodiment.

As described in the first exemplary embodiment, a notification issued via the signal line CS is issued also to a communication sub device such as the lens microcomputer 111 that is not a communication partner in P2P burst communication. Thus, the notification can affect an operation of the communication sub device. In contrast to this, flow control is executed using the signal line DATA without setting the signal line CS to Lo, and therefore P2P burst communication can be performed without affecting the communication sub device, in the present exemplary embodiment. Nevertheless, in this case, it is necessary to avoid interference of output to the signal line DATA, between the camera microcomputer 205 and the adapter microcomputer 302. Specifically, the adapter microcomputer 302 needs to connect the signal line DATA to its data input unit in step S1001 of FIG. 20, before the camera microcomputer 205 connects the signal line DATA to its data output unit in step S901 of FIG. 19. In a similar manner, the camera microcomputer 205 needs to connect the signal line DATA to its data input unit in step S906 of FIG. 19, before the adapter microcomputer 302 connects the signal line DATA to its data output unit in step 1008 of FIG. 20. It is therefore desirable that the connection of the signal line DATA to the data output units in step S901 of FIG. 19 and step 1008 of FIG. 20 is executed with an appropriate latency time.

In the present exemplary embodiment, data corresponding to specific two bytes is transmitted, for flow control, to the signal line DATA, but the configuration is not limited to this. For example, the data transmission can be substituted by setting the signal level of the signal line DATA to Lo for a specific time and then setting the signal level to Hi, similarly to a standby request signal on the signal line CS in the case of the first exemplary embodiment. If there is no need to execute processing other than communication in a waiting time corresponding to the inter-block wait time, flow control to be performed using data corresponding to two bytes can be performed using data corresponding to one byte. In other words, the first byte indicating a start of flow control, which is out of data corresponding to two bytes, can be omitted. Specifically, it is sufficient that a processing flow in FIG. 20 that is to be performed by the adapter microcomputer 302, which performs transmission in P2P burst communication, is changed as follows. In a case where a determination result in step S1003 becomes NO, the processing proceeds to step S1005. In a case where a determination result in step S1005 becomes NO, the processing in step S1005 is repeated. In a case where a determination result in step S1003 becomes YES, the processing proceeds to step S1006. In a case where a determination result in step S1006 becomes YES, the processing proceeds to step S1008. Conditional branching processing in step S1004 and conditional branching processing in step S1007 are omitted. Conditional branching processing in step S505 of FIG. 19 and processing in step S902 of FIG. 19 that are performed by the camera microcomputer 205, which performs reception in P2P burst communication, are omitted.

Also in P2P burst communication performed by a communication main device, a method of flow control using the signal line DATA is similar.

A third exemplary embodiment of a system, which is not limited to an imaging system, including a transmission apparatus (transmission side apparatus), a receiving apparatus (reception side apparatus), a first communication channel (first communication path), and a second communication channel (second communication path) will be described. The first communication channel is a channel for transmitting a signal for flow control from the receiving apparatus to the transmission apparatus. The second communication channel is a channel for transmitting data from the transmission apparatus to the receiving apparatus.

FIG. 21 is a diagram exemplifying a signal waveform in burst communication that uses a first communication channel and a second communication channel. In FIG. 21, after data transmission corresponding to one block, a transmission apparatus stops data transmission for an inter-block wait time. When data transmission corresponding to the number of blocks up to flow control is completed, the transmission apparatus waits for flow control to be performed by a receiving apparatus. After data reception corresponding to one block, the receiving apparatus makes arrangements for data reception related to the next block, within the inter-block wait time. When data reception corresponding to the number of blocks up to flow control is completed, the receiving apparatus executes necessary processing, and then performs flow control. By repeating the above-described processing, it becomes possible to execute efficient and high-speed data transfer from the transmission apparatus to the receiving apparatus. In this manner, a communication apparatus according to the present exemplary embodiment that performs data communication has a communication function of performing data communication in a data block unit having a specific data size, while interposing a specific waiting time. The communication apparatus also has a standby function of performing standby processing of communication using a request signal for requesting communication standby after executing communication in a data block unit a plurality of times.

The above-described processing can also be applied to a system that performs transmission for flow control from a receiving apparatus to a transmission apparatus, and data transmission from the transmission apparatus to the receiving apparatus, using the same communication channel. FIG. 22 is a diagram exemplifying a signal waveform in burst communication that uses a single communication channel. In FIG. 22, a transmission apparatus transmits data corresponding to one block, in a state in which a single communication channel is connected to a data output unit, and then stops data transmission for an inter-block wait time. When data transmission corresponding to the number of blocks up to flow control is completed, the transmission apparatus connects the single communication channel to the data input unit, and waits for flow control from the receiving apparatus. The receiving apparatus receives the data corresponding to one block, in a state in which the single communication channel is connected to the data input unit, and then makes arrangements for data reception regarding a next block, within the inter-block wait time. When data reception corresponding to the number of blocks up to flow control is completed, the receiving apparatus connects the single communication channel to the data output unit, executes necessary processing, and then performs flow control. By repeating the above-described processing, it becomes possible to execute efficient and high-speed data transfer from the transmission apparatus to the receiving apparatus.

One or more functions of the above-described exemplary embodiments can also be implemented by a program for implementing the functions. The program can be supplied to an apparatus or a system via a network or a storage medium, and read out and executed by one or more processors in a computer of the apparatus or the system. In addition, the functions can also be implemented by a circuit (for example, an application specific integrated circuit (ASIC)) implementing the functions.

Heretofore, exemplary embodiments of the present invention have been described, but the present invention is not limited to these exemplary embodiments, and various modifications and changes can be made without departing from the gist thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-155592, filed Sep. 16, 2020, which is hereby incorporated by reference herein in its entirety.

What is claimed is:

1. An accessory apparatus including an optical member, and configured to be detachably attached to an image pickup apparatus, the accessory apparatus comprising:
a communication unit configured to perform communication with the image pickup apparatus with a first communication for the image pickup apparatus to perform notification to the accessory apparatus that the image pickup apparatus communicates with the accessory apparatus, and a second communication and a third communication to be used for performing communication between the image pickup apparatus and the accessory apparatus that has received the notification,
wherein a time interval between two request signals for requesting standby of communication between the image pickup apparatus and the accessory apparatus with the third communication is longer than that with the second communication.

2. The accessory apparatus according to claim 1, wherein a communication information amount in the time interval in accordance with the third communication is larger than a communication information amount in the time interval in accordance with the second communication.

3. The accessory apparatus according to claim 1, wherein the communication unit is configured to perform communication with the image pickup apparatus with the third communication in a case where the communication unit receives a specific command with the second protocol.

4. The accessory apparatus according to claim 1, wherein the communication unit is configured to perform communication with the third communication with a plurality of data blocks interposing a specific waiting time as a unit.

5. The accessory apparatus according to claim 1, further comprising:
a first communication path to be used for communication of the request signal; and
a second communication path to be used for data communication between the image pickup apparatus and the accessory apparatus,
wherein the communication unit is configured to perform standby processing of communication with the third communication using the request signal via the first communication path.

6. The accessory apparatus according to claim 1, further comprising:
a first communication path to be used for communication of the request signal; and
a second communication path to be used for data communication between the image pickup apparatus and the accessory apparatus,
wherein the communication unit is configured to perform standby processing of communication with the third communication using the request signal via the second communication path.

7. The accessory apparatus according to claim 5, wherein the communication unit is configured to perform the standby processing with the third communication with a plurality of data blocks as a unit.

8. The accessory apparatus according to claim 5, wherein the communication unit is configured to perform communication with the second communication of information regarding a condition of communication with the third communication.

9. The accessory apparatus according to claim 8, wherein the condition of the communication is related to a total size of data to be communicated, a size of a data block to be communicated, a time of the standby processing, or a size of data to be communicated between two pieces of the standby processing or any combination thereof.

10. The accessory apparatus according to claim 1, wherein the communication unit is configured to perform switching from communication with the third communication to communication with the first communication in a case where the communication unit detects a start of communication with the first communication while performing communication with the third communication.

11. The accessory apparatus according to claim 1, wherein the communication unit is configured to perform with the third communication either data transmission from the accessory apparatus to the image pickup apparatus or data transmission from the image pickup apparatus to the accessory apparatus.

12. An image pickup apparatus including an image pickup element, to which an accessory apparatus is detachably attached, the image pickup apparatus comprising:
- a communication unit configured to perform communication with the accessory apparatus with a first communication for the image pickup apparatus to perform notification to the accessory apparatus that the image pickup apparatus communicates with the accessory apparatus, and a second communication and a third communication to be used for performing communication between the image pickup apparatus and the accessory apparatus that has received the notification,
- wherein a time interval between two request signals for requesting standby of communication between the image pickup apparatus and the accessory apparatus with the third communication is longer than that with the second communication.

13. The image pickup apparatus according to claim 12, wherein a communication information amount in the time interval in accordance with the third communication is larger than a communication information amount in the time interval in accordance with the second communication.

14. The image pickup apparatus according to claim 12, wherein the communication unit is configured to perform communication with the third communication with a plurality of data blocks interposing a specific waiting time as a unit.

15. The image pickup apparatus according to claim 12, further comprising:
- a first communication path to be used for communication of the request signal; and
- a second communication path to be used for data communication between the image pickup apparatus and the accessory apparatus,
- wherein the communication unit is configured to perform standby processing of communication with the third communication using the request signal via the first communication path.

16. The image pickup apparatus according to claim 12, further comprising:
- a first communication path to be used for communication of the request signal; and
- a second communication path to be used for data communication between the image pickup apparatus and the accessory apparatus,
- wherein the communication unit is configured to perform standby processing of communication with the third communication using the request signal via the second communication path.

17. The image pickup apparatus according to claim 12, wherein the communication unit is configured to start communication with the first communication while performing communication with the third communication to perform switching from communication with the third communication to communication with the first communication.

18. An image pickup system comprising:
- the accessory apparatus according to claim 1; and
- an image pickup apparatus to which the accessory apparatus is detachably attached.

19. An image pickup system comprising:
- the image pickup apparatus according to claim 12; and
- an accessory apparatus detachably attached to the image pickup apparatus.

20. A computer-readable non-transitory storage medium storing a program for causing a computer to execute a communication method in an accessory apparatus including an optical member, and configured to be detachably attached to an image pickup apparatus, the communication method comprising:
- performing communication with the image pickup apparatus with a first communication for the image pickup apparatus to perform notification to the accessory apparatus that the image pickup apparatus communicates with the accessory apparatus, and a second communication and a third communication to be used for performing communication between the image pickup apparatus and the accessory apparatus that has received the notification,
- wherein a time interval between two request signals for requesting standby of communication between the image pickup apparatus and the accessory apparatus with the third communication is longer than that with the second communication.

21. A computer-readable non-transitory storage medium storing a program for causing a computer to execute a communication method in an image pickup apparatus including an image pickup element, to which an accessory apparatus is detachably attached, the communication method comprising:
- performing communication with the accessory apparatus with a first communication for the image pickup apparatus to perform notification to the accessory apparatus that the image pickup apparatus communicates with the accessory apparatus, and a second communication and a third communication to be used for performing communication between the image pickup apparatus and the accessory apparatus that has received the notification,
- wherein a time interval between two request signals for requesting standby of communication between the image pickup apparatus and the accessory apparatus with the third communication is longer than that with the second communication.

* * * * *